(12) United States Patent
Choe

(10) Patent No.: US 7,031,320 B2
(45) Date of Patent: Apr. 18, 2006

(54) APPARATUS AND METHOD FOR PERFORMING HIGH-SPEED IP ROUTE LOOKUP AND MANAGING ROUTING/FORWARDING TABLES

(75) Inventor: Myongsu Choe, Suwon-shi (KR)

(73) Assignee: Samsung Electronics Co., Ltd., Suwon-si ( * ) Notice: Subject to any disclaimer, the term of this patent is extended or adjusted under 35 U.S.C. 154(b) by 998 days.

(21) Appl. No.: 10/022,210

(22) Filed: Dec. 20, 2001

(65) Prior Publication Data

US 2002/0118682 A1 Aug. 29, 2002

Related U.S. Application Data

(60) Provisional application No. 60/257,148, filed on Dec. 22, 2000.

(30) Foreign Application Priority Data

Feb. 15, 2001 (KR) ................ 2001-7568

(51) Int. Cl.
*H04L 12/56* (2006.01)
(52) U.S. Cl. ................ 370/395.31
(58) Field of Classification Search ............ 370/395.1, 370/395.31, 465, 401, 351, 352, 389, 428; 707/2
See application file for complete search history.

(56) References Cited

U.S. PATENT DOCUMENTS

| 5,671,406 A * | 9/1997 | Lubbers et al. ........... 707/7 |
|---|---|---|
| 5,781,772 A | 7/1998 | Wilkinson, III et al. |
| 5,796,966 A | 8/1998 | Simcoe et al. |
| 6,011,795 A | 1/2000 | Varghese et al. |
| 6,014,659 A | 1/2000 | Wilkinson, III et al. |
| 6,018,524 A | 1/2000 | Turner et al. |
| 6,061,712 A | 5/2000 | Tzeng |
| 6,067,574 A | 5/2000 | Tzeng |
| 2005/0182752 A1* | 8/2005 | Rojer ........................ 707/2 |

OTHER PUBLICATIONS

Japanese Office Action in connection with Korean Patent Application No. 2001-7568, issued on Sep. 6, 2005.
IEEE INFORMCOM'01, vol. 3, pp1444-1453 to F. Ergun et al., entitled *Scalable High Speed IP Routing Lookups*, published on Apr. 2001.
Keshav, S. and Sharma, R., Issues and Trends in Router Design, IEEE Communications Magazine, pp. 144-151, May, 1998.
Kumar, V. and Lakshman, T. and Stiliadis, D., Beyond Best Effort: Router Architectures for the Differentiated Services of Tomorrow's Internet, IEEE Communications Magazine, pp. 152-164,May,1998.

(Continued)

*Primary Examiner*—Dang Ton
(74) *Attorney, Agent, or Firm*—Robert E. Bushnell, Esq.

(57) ABSTRACT

A method for constructing routing/forwarding tables for an IP address lookup using a skip list. The method comprises dividing a prefix length range of an IP address in a preset method; creating a header node having a maximum level based on a number of clusters divided into the prefix length range, the header node pointing every node in the skip list; and creating subnodes by the number of the divided clusters, the subnodes each having the divided prefix length range as a key.

36 Claims, 17 Drawing Sheets

OTHER PUBLICATIONS

Chan, H., Alnuweiri, H. and Leung, V., A Framework for Optimizing the Cost and Performance of Next-Generation IP Routers, IEEE Journal of Selected Areas in Communications, vol. 17, No. 6, pp. 1013-1029, Jun. 1999.

Partridge, C. et al., A 50-Gb/s IP Router, IEEE/ACM Trans. on Networking, vol. 6, No. 3, pp. 237-248, 1998.

Metz, C., IP Routers: New Tool for Gigabit Networking, IEEE Internet Computing, pp. 14-18, Nov.-Dec., 1998.

Asthana, A., Delph, C., Jagadish, H., and Krzyanowski, P., "Towards a gigabit IP router", J. High Speed Network, vol. 1, No. 4, pp. 281-288, 1992.

RFC 1518, An Architecture for IP Address Allocation with CIDR, Sep. 1993.

RFC 1517, Applicability Statement for the Implementation of Classless Inter-Domain Routing (CIDR), Sep. 1993.

Doeringer, W., Karjoth, G. and Nassehi, M., Routing on Longest-Matching Prefixes, IEEE/ACM Trans. on Networking, vol. 4, No. 1, pp. 86-97, Feb., 1996.

Degermark, M., Brodnik, A., Carlsson, S. and Pink, S., Small Forwarding Tables for Fast Routing Lookups, In Proceedings of ACM SIGCOMM '97, pp. 3-14, Cannes, France, 1997.

Srinivasan, V. and Varghese, G., Faster IP Lookups using Controlled Prefix Expansion, In Proceedings of ACM Sigmetrics '98 Conf., pp. 1-11, 1998.

Lampson, B., Srinivasan, V. and Varghese, G., IP Lookups using Multiway and Multicolumn Search, In IEEE Infocom, pp. 1248-1256, 1998.

Tzeng, H. and Pryzygienda, T., On Fast Address-Lookup Algorithms, IEEE Journal on Selected Areas in Communications, vol. 17, No. 6, pp. 1067-1082, Jun., 1999.

Waldvogel, M., Varghese, G., Turner, J. and Plattner, B., Scalable High Speed IP Routing Lookups, In Proceedings of ACM SIGCOMM '97, Cannes, France, pp. 25-37, 1997.

Waldvogel, M., Varghese, G., Turner, J. and Plattner, B., Scalable Best Matching Prefix Lookups, In Proceedings of PODC '98, Puerto Vallarta, p., 1998.

Kijkanjanarat, T. and Chao, H., Fast IP Lookups Using a Two-trie Data Structure, In Proceedings of Globecom'99, Global Telecommunication Conference 1999, vol. 2, pp. 1570-1575.

Nillson, S. and Karlsoson, G., IP-Addresses Lookup Using LC-Tries, IEEE Journal on Selected Areas in Communications, vol. 17, No. 16, pp. 1083-1092, 1999.

Crescenzi, P., Dardini, L. and Grossi, R., "IP Address Lookup Made Fast and Simple", Technical Report TR-99-01, Dipartimento di Informatica, University a Di Pisa, 1999.

Gupta, P., Lin, S. and McKeown, N., Routing Lookups in Hardware at Memory Access Speeds, In Proceedings of IEEE INFOCOM '98 Conf., pp. 1240-1247, 1998.

McAuley, A. and Francis, P., Fast Routing Table Lookup Using CAMs, In Proceedings of IEEE INFOCOM '93, vol. 3, pp. 1382-1391, 1993.

Huang, N. and Zhao, S., A Novel IP-Routing Lookup Scheme and Hardware Architecture for Multigigabit Switching Routers, IEEE Journal on Selected Areas in Communications, vol. 17, No. 6, pp. 1093-1104, Jun., 1999.

Pugh, W., Skip Lists: A Probabilistic Alternatives to Balanced Trees, CACM 33(6), pp. 668-676, 1990.

Sleator, D. and Tarjan, R., Self-Adjusting Binary Search Trees, JACM, vol. 32, No. 3, Jul. 1985.

IPMA (Internet Performance Measurement and Analysis), http://nic.merit.edu/ipma.

Cormen, T., Leiserson, C. and Rivest, R., Introduction to Aldorithms, McGraw-Hill, New York, Jun. 1990.

* cited by examiner

APPARATUS AND METHOD FOR PERFORMING HIGH-SPEED IP ROUTE LOOKUP AND MANAGING ROUTING/FORWARDING TABLES

CLAIM OF PRIORITY

This application claims priority to, incorporates the same herein, a provisional application entitled "High-Speed IP Routing Lookups and Routing Table Management" filed in the U.S. Patent Office on Dec. 22, 2000 and assigned Serial No. 60/257,148; and an application entitled "Route Lookup and Routing/Forwarding Table Management For High-Speed Internet Protocol Router" filed in the Korean Industrial Property Office on Feb. 15, 2001 and assigned Serial No. 2001-7568.

BACKGROUND OF THE INVENTION

1. Field of the Invention

The present invention relates generally to a routing technique for forwarding packets to a destination in the Internet, and in particular, to an apparatus and method for performing a high-speed IP (Internet Protocol) route lookup and managing a routing (or forwarding) table.

2. Description of the Related Art

According to the increasing number of Internet users, variety of supported services and the expansion of service areas such as VoIP (Voice over Internet Protocol) and stream-oriented applications, the traffic in the Internet has been increased exponentially. Forwarding packets to the next hop interface by finding a destination path without causing any delay in a Giga or Tera bps-class high-speed router has emerged as a contingent design issue. In order to find the destination path of the packets forwarded over physical input interfaces of the router, maintaining a routing (or forwarding) table in a compact form and reducing lookup time are required.

In a conventional router, before the advent of recently deployed high-speed routers where a required time to process packets and find their destinations is faster than the one on the transmission paths, a router, as a relaying node connecting subnetworks or other networks, has played its roles well. Recently, the bandwidth increase of optical networking interface such as POS OC-192 (10 Gbps) or IP over DWDM (Dense Wavelength Division Multiplexing) has surpassed a processing time in a router and raised blame that a router causes a dominant bottleneck in a high-speed Internet. For a background discussion on Routers see: Keshav, S. and Sharma, R., *Issues and Trends in Router Design*, IEEE Communications Magazine, pages 144–151, May,1998; Kumar, V. and Lakshman, T. and Stiliadis, D., *Beyond Best Effort: Router Architectures for the Differentiated Services of Tomorrow's Internet*, IEEE Communications Magazine, pages 152–164, May,1998; Chan, H., Alnuweiri, H. and Leung, V., *A Framework for Optimizing the Cost and Performance of Next-Generation IP Routers*, IEEE Journal of Selected Areas in Communications, Vol. 17, No.6, pages 1013–1029, June 1999; Partridge, C. et al., *A 50-Gb/s IP Router*, IEEE/ACM Trans. on Networking, vol. 6, no.3, pages 237–248, 1998; and Metz, C., IP Routers: *New Tool for Gigabit Networking, IEEE Internet Computing*, pages 14–18, November–December, 1998.

In the early 1990s, a working group of an IETF (Internet Engineering Task Force) introduced a new IP addressing scheme called CIDR (Classless Inter-Domain Routing) to use IP addresses efficiently in IPv4 (IP version 4). See RFC (Request for Comments: Network Working Group) 1518, *An Architecture for IP Address Allocation with CIDR*, September 1993; and RFC 1517, *Applicability Statement for the Implementation of Classless Inter-Domain Routing (CIDR)*, September 1993.

In this case, in order to grasp a prefix in the packets having various prefix lengths and find an IP address matching to the longest prefix, an LPM (Longest Prefix Matching) algorithm based on a trie or Patricia (Practical Algorithm to Retrieve Information Coded as Alphanumeric) trie data structure has been widely used. See Doeringer, W., Kaijoth, G. and Nassehi, M., *Routing on Longest-Matching Prefixes, IEEE/ACM Trans. on Networking*, vol.4, no. 1, pages 86–97, February, 1996.

The LPM algorithm will be described in detail with reference to Table 1 below. Table 1 shows a simple example of routing entries contained in a routing (or forwarding) table. The asterisk allows the padding of any number with '0' or '1' although the prefix per se cannot exceed 32 in the case of IPv4. For example, '0*' implies '01*', '011*' or '010*', no matter what the rest of bit strings are.

TABLE 1

| Prefix | Interface |
|---|---|
| 0* | 00 |
| 01010* | 10 |
| 010101* | 10 |
| 0101011* | 11 |
| 1* | 11 |
| 11* | 01 |
| 10* | 11 |
| 1110* | 01 |
| 100101011* | 11 |
| 100101010* | 11 |
| 1001010101* | 10 |

The routing entry or route is represented by IP-address:: ={<network prefix>,<host number>}. When a destination IP address is '10010101000 ... 0', the first bit of the destination IP address is compared with the network prefixes (simply prefixes) contained in the routing table. Thus, prefixes such as '0*', '01010*', '010101*' and '0101011*' are discarded because these ones have the first bit starting from '0'. When the given destination address is compared with the rest of prefixes, prefixes '11*', '1110*' and '1001010101*' are excluded because they are not matching with the destination address from the second or $10^{th}$ bit. Among the plausible prefixes (e.g., '1*', '10*' and '100101010*'), '100101010*' is chosen as the longest prefix (or most specific) matching route and the IP packet with the destination IP address is forwarded to the adjacent router through the interface '10'.

Meanwhile, a recently announced routing lookup algorithm is stored in a cache memory in a possible processor (routing processor or forwarding engine) to reduce a memory access time. Although the routing lookup algorithm based on the routing table secures an efficient lookup, it cannot change the routing (or forwarding) table. Hence, the routing lookup algorithm may cause time delay in reflecting the routing table, when changed.

In addition, a routing table in a routing processor is copied through a DMA (Direct Memory Access) card, an IPC (Inter-Processor Communication) card or a switch fabric, and then applied to a forwarding table in the forwarding engine. At this point, it is necessary to build up a new forwarding table rather than adding and deleting only the changed routes. This may cause additional time delay, and also cause a bottleneck in an internal memory of the router or a system bus due to an increase in the memory bandwidth in use at a memory access request from the router.

Furthermore, in the case of some algorithms, an initial routing (or forwarding) table must be built up using link reachability information representing the current link state of the router. Therefore, in order to sequentially insert the link reachability information in the routing table, an additional process to sort every route according to prefix lengths in advance is required. See Degermark, M., Brodnik, A., Carlsson, S. and Pink, S., *Small Forwarding Tables for Fast Routing Lookups*, In Proceedings of ACM SJGCOMM '97, pages 3–14, Cannes, France, 1997; Srinivasan, V. and Varghese, G., *Faster IP Lookups using Controlled Prefix Expansion*, In Proceedings of ACM Sigmetrics '98 Conf., pages 1–11, 1998; Lampson, B., Srinivasan, V. and Varghese, G., *IP Lookups using Multiway and Multicolumn Search*, In IEEE Infocom, pages 1248–1256,1998; Tzeng, H. and Pryzygienda, T., *On Fast Address-Lookup Algorithms*, IEEE Journal on Selected Areas in Communications, Vol. 17, No. 6, pages 1067–1082, June, 1999; Waldvogel, M., Varghese, G., Turner, J. and Plattner, B., *Scalable High Speed IP Routing Lookups*, In Proceedings of ACM SIGCOMM '97, Cannes, France, pages 25–37, 1997; and Waldvogel, M., Varghese, G., Turner, J. and Plattner, B., *Scalable Best Matching Prefix Lookups*, In Proceedings of PODC '98, Puerto Vallarta, page, 1998.

Typically used data structures in a routing table such as a radix tree or a Patricia trie not only cause an increase in number of memory accesses required to find a packet path, but also require a considerable update time to reflect the changed routes caused by setting or deleting routes from the neighboring routers of the corresponding router. Degermark, M., Brodnik, A., Carlsson, S. and Pink, S., *Small Forwarding Tables for Fast Routing Lookups*, in Proceedings of ACM SIGCOMM '97, pages 3–14, Cannes, France, 1997, proposed a compact forwarding table which can be stored in a cache of the forwarding engine, but it is hard to reflect the changed routes into it. A controlled prefix expansion method proposed by Srinivasan, V. and Varghese, G., *Faster IP Lookups using Controlled Prefix Expansion*, In Proceedings of ACM Sigmetrics '98 Conf., pages 1–11, 1998 (see U.S. Pat. No. 6,011,795, issued to George Varghese and Srinivasan and entitled *Method and Apparatus for Fast Hierarchical Address Lookup Using Controlled Expansion of Prefixes*) and a fast address-lookup algorithm proposed by Tzeng, H. and Pryzygienda, T., *On Fast Address-Lookup Algorithms, IEEE Journal on Selected Areas in Communications*, Vol. 17, No. 6, pages 1067–1082, June, 1999 are also based on a multi-resolution trie, but it is hard to add and delete the routes because the data structures are based on the trie. In this connection, refer to U.S. Pat. No.6,061,712 entitled *Method for IP Routing Table Look-up* and U.S. Pat. No. 6,067,574, entitled *High Speed Routing Using Compressed Tree Process*, both issued to Hong-Yi Tzeng. A rope search algorithm (Waldvogel, M., Varghese, G., Turner, J. and Plattner, B., *Scalable High Speed IP Routing Lookups*, In Proceedings of ACM SIGCOMM '97, Cannes, France, pages 25–37, 1997; and Waldvogel, M., Varghese, G., Turner, J. and Plattner, B., *Scalable Best Matching Prefix Lookups*, In Proceedings of PODC '98, Puerto Vallarta, page, 1998) by mapping a trie structure to a binary tree with hash tables and a complete prefix trie based on multi-resolution trie by (Tzeng, H. and Pryzygienda, T., *On Fast Address-Lookup Algorithms*, IEEE Journal on Selected Areas in Communications, Vol. 17, No. 6, pages 1067–1082, June, 1999) tend to be inefficient due to the update of the changed route entries because those data structures are based on the trie. In this connection, refer to U.S. Pat. No. 6,018,524 issued to Jonathan Turner, George Varghese and Marcel Waldvogel and entitled *Scalable High Speed IP Routing Lookups*.

Aside from the above, other variants of the trie have been proposed. For example, a two-trie scheme (Kijkanjanarat, T. and Chao, H., *Fast IP Lookups Using a Two-trie Data Structure*, In Proceedings of Globecom '99, 1999) by linking two tries to reduce the search time and an LC-trie (Nillson, S. and Karlsoson, G., *IP-Addresses Lookup Using LC-Tries, IEEE Journal on Selected Areas in Communications*, Vol.17, No. 16, pages 1083–1092, 1999) to reduce level length in a trie, and a DP-trie (Doeringer, W., Kaijoth, G. and Nassehi, M., *Routing on Longest-Matching Prefixes, IEEE/ACM Trans. on Networking*, vol.4, no.1, pages 86–97, February, 1996) have been suggested. They still have difficulties, however, in reflecting the changed routes into the routing (or forwarding) table.

In addition, although previously mentioned schemes contribute to a reduction in lookup time, there still exists a problem concerning route updates. Hardware-assisted schemes are also suggested to reduce the lookup time. Gupta, P., Lin, S. and McKeown, N., *Routing Lookups in Hardware at Memory Access Speeds*, In Proceedings of IEEE INFOCOM '98 Conf., pages 1240–1247, 1998, proposed a solution based on the use of large-scale memory. Reducing the lookup time is possible in comparisons with software-based ones, but it still poses significant amount of memory use and cost in the transition of IPv6. A scheme using CAM (Content Addressable Memory) was suggested by McAuley, A. and Francis, P., *Fast Routing Table Lookup Using CAMs*, In Proceedings of IEEE INFOCOM '93, Vol.3, pages 1382–1391, 1993, but due to the high price of CAM, it is not being I a: considered for use at present. Huang, N. and Zhao, S., *A Novel IP-Routing Lookup Scheme and Hardware Architecture for Multigigabit Switching Routers*, IEEE Journal on Selected Areas in Communications, Vol. 17, No. 6, pages 1093–1104, June, 1999, proposes an indirect lookup algorithm using a pipelined memory access to reduce memory accesses although it has a disadvantage over IPv6 transition.

SUMMARY OF THE INVENTION

It is, therefore, an object of the present invention to provide a method for performing high-speed IP route lookups and managing routing/forwarding tables, capable of minimizing a memory access time using a randomized algorithm, thereby securing cost-effective utilization of the memory.

It is another object of the present invention to provide a method for performing high-speed IP route lookups and managing routing/forwarding tables, which can easily change and manage addition and deletion of routes.

It is yet another object of the present invention to provide a method for performing high-speed IP route lookups and managing routing/forwarding tables, which can efficiently build up a routing table and/or a forwarding table without sorting relevant routes according to prefix lengths of routes to be input during construction of the tables.

In accordance with a first aspect of the present invention, there is a provided method for searching an IP address having a prefix length range as a key using a skip list comprised of a header node having a key of a predetermined maximum value, and a plurality of nodes (subnodes) each having a key of a fixed (or variable) range, preset in a descending order, and storing route entries corresponding to respective prefix lengths in hash tables associated with the respective prefix lengths.

In accordance with a second aspect of the present invention, a method for creating an IP routing table using a skip list comprises the steps of creating a header node having a maximum level to manage every node in the skip list; inserting a plurality of nodes having a divided prefix range into the skip list; and creating a hash table for storing route entries given at each node corresponding to the prefix range.

In accordance with a third aspect of the present invention, there is provided a method for updating a routing table using a skip list in which route entries are stored in a form of a hash table according to a prefix length set in each node generated according to a prefix length range of an IP address. The method comprises the steps of: finding a node in which a prefix range corresponding to a prefix length of a route to be updated is set; searching a hash table having a same prefix length as that of the route to be updated in the found node; and updating a corresponding route in the hash table, when the hash table is found.

In accordance with a fourth aspect of the present invention, there is provided a route lookup method of a routing table using a skip list in which route entries are stored in a form of a hash table according to preset prefix lengths in each node generated according to assignment of the prefix range of an IP address. The method comprising the steps of: finding an adjacent node starting from a first node of the skip list; comparing a destination address with respective hash tables at a corresponding node; and considering a matching prefix as a longest prefix, when the hash table includes the destination address.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

First, a description will be made of a router and a routing method to which the present invention is applicable. Chan et al. (*A Framework for Optimizing the Cost and Performance of Next-Generation IP Routers*, IEEE Journal of Selected Areas in Communications, Vol. 17, No.6, pages 1013–1029, June 1999) classifies two major lines of high-speed router's architecture as a distributed or parallel one where the major distinction between them is dependent upon the location of the forwarding engine. A high-speed backbone router tends to have a distributed architecture rather than the conventional centralized architecture.

Figure 1:
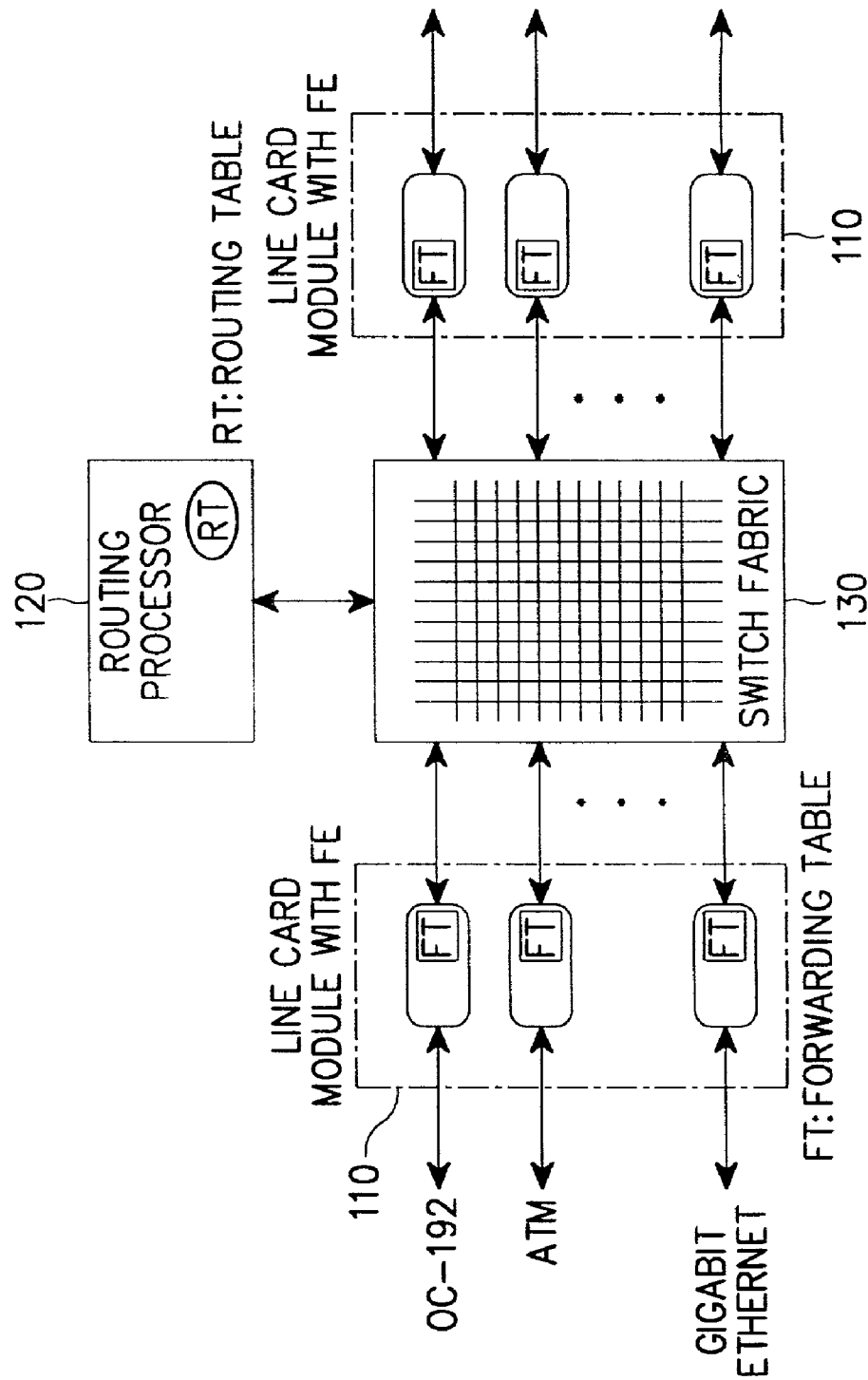
FIG. 1 is a schematic diagram illustrating a distributed router architecture to which the present invention is applicable.

FIG. 1 illustrates a router with the distributed architecture to which the present invention is (applicable. Referring to FIG. 1, the router includes a line card module 110 equipped with a forwarding engine FE, through which the packets are input and output, a routing processor 120 for building up an initial routing table RT and managing the routing table, and a switch fabric 130 used when the packets are switched to a specific port in the router.

The routing processor 120 includes a routing table RT updated by reflecting the last changed routes. The routing table RT is generated from routing protocols such as RIP (Routing Information Protocol), OSPF (Open Shortest Path First) or BGP-4 (Border Gateway Protocol 4), but is not limited to these protocols. A compact table called a forwarding table FT designed for an efficient lookup is copied from the routing table in the routing processor 120. The forwarding table FT is only designed for an efficient lookup by sacrificing the efficiency of route additions and deletions.

If the packet incoming from the line card module 110 cannot find its destination path from the forwarding table FT, the corresponding packet must pass through the switch fabric 130 to the routing processor 120 to resolve its unmatched route. After finding its destination, the packet must route to the switch fabric 130 again to transfer the packet to the output line card module 110. Otherwise, if the routing processor 120 cannot find the destination path even through the routing table RT, the packet is discarded at the routing processor 120.

Figure 2:
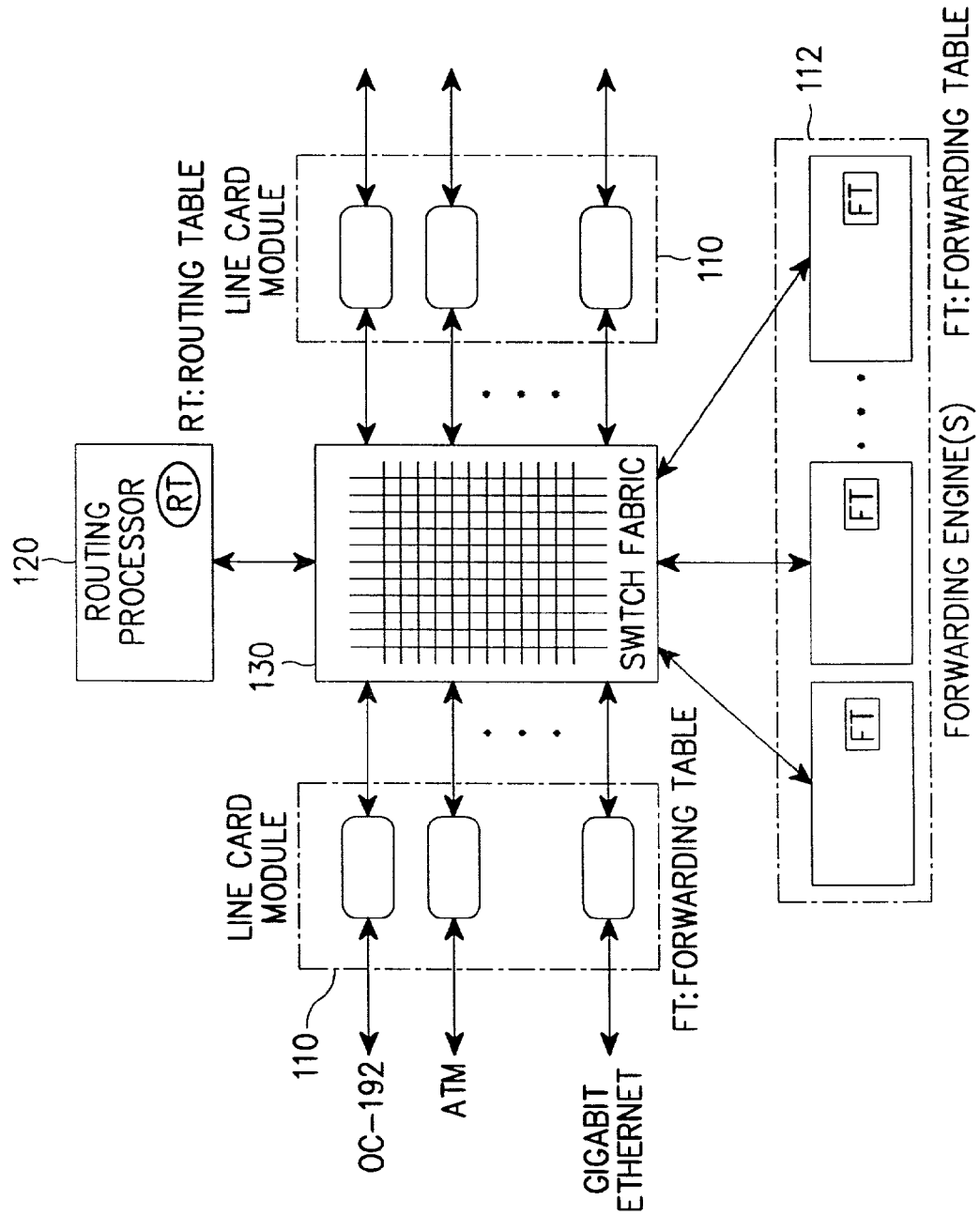
FIG. 2 is a schematic diagram illustrating a parallel router architecture to which the present invention is applicable.

Meanwhile, Asthana, A., Delph, C., Jagadish, H., and Krzyzanowski, P., *Towards a Gigabit IP Router*, J. High Speed Network, vol. 1, no.4, pages 281–288,1992 and Partridge et al. (A 50-Gb/s *IP Router, IEEE/ACM Trans. on Networking*, vol. 6, no.3, pages 237–248, 1998) disclose a router with a parallel architecture. FIG. 2 illustrates a router with a parallel architecture to which the present invention is applicable. In the router with the parallel architecture shown in FIG. 2, each forwarding engine 112 with the forwarding table FT is separated from the line card module 110. Such a parallel architecture uses a client and server-based model for handling route lookups and parallel packet processing in each forwarding engine.

The routing table in the routing processor 120 must be so designed that it can immediately reflect the changed routes and it can be readily maintained. Further, a route to be added or deleted must be reflected into the forwarding table FT in the forwarding engine 112 as rapidly as possible at the least expense. When the route is not reflected, the incoming packet is transferred to the routing processor 120 through the switch fabric 130, causing an increase in transmission delay due to bypassing through the additional route required in processing the corresponding packet.

While the invention has been described with reference to the distributed router and the parallel router, it should be apparent to those skilled in the art that the invention can be applied to a router having other architectures.

Figure 3:
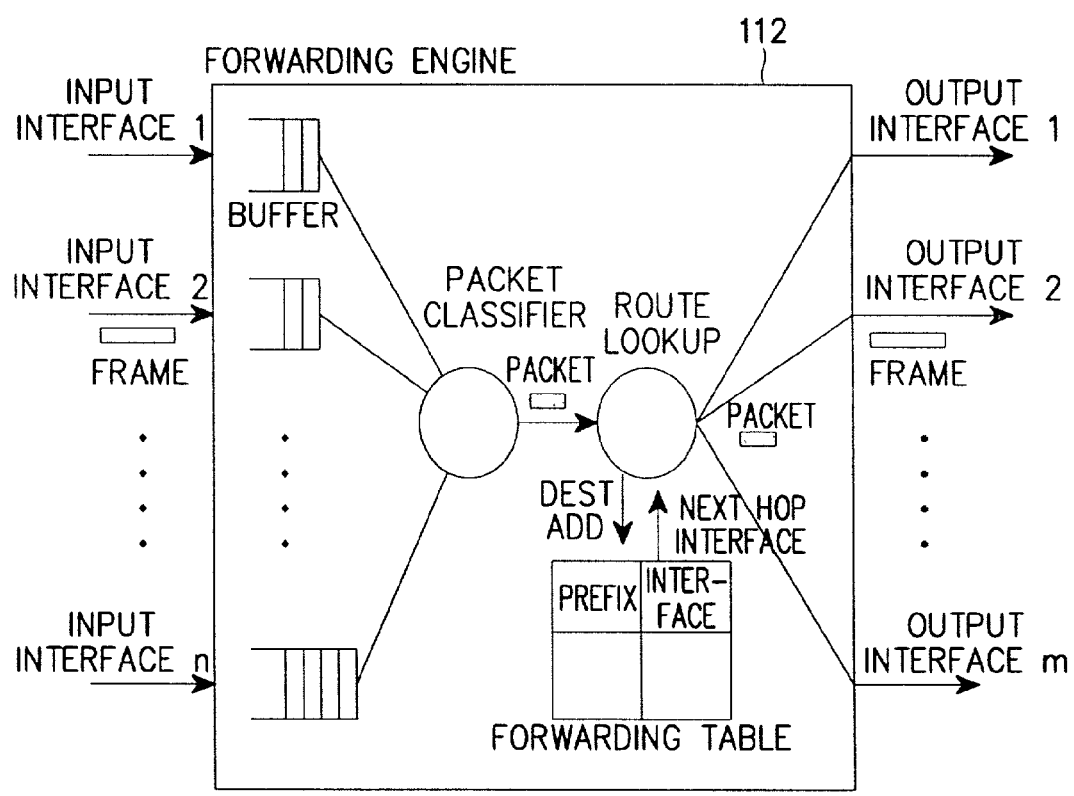
FIG. 3 is a schematic diagram illustrating a structure of a forwarding engine to which the present invention is applicable.
Figure 4:
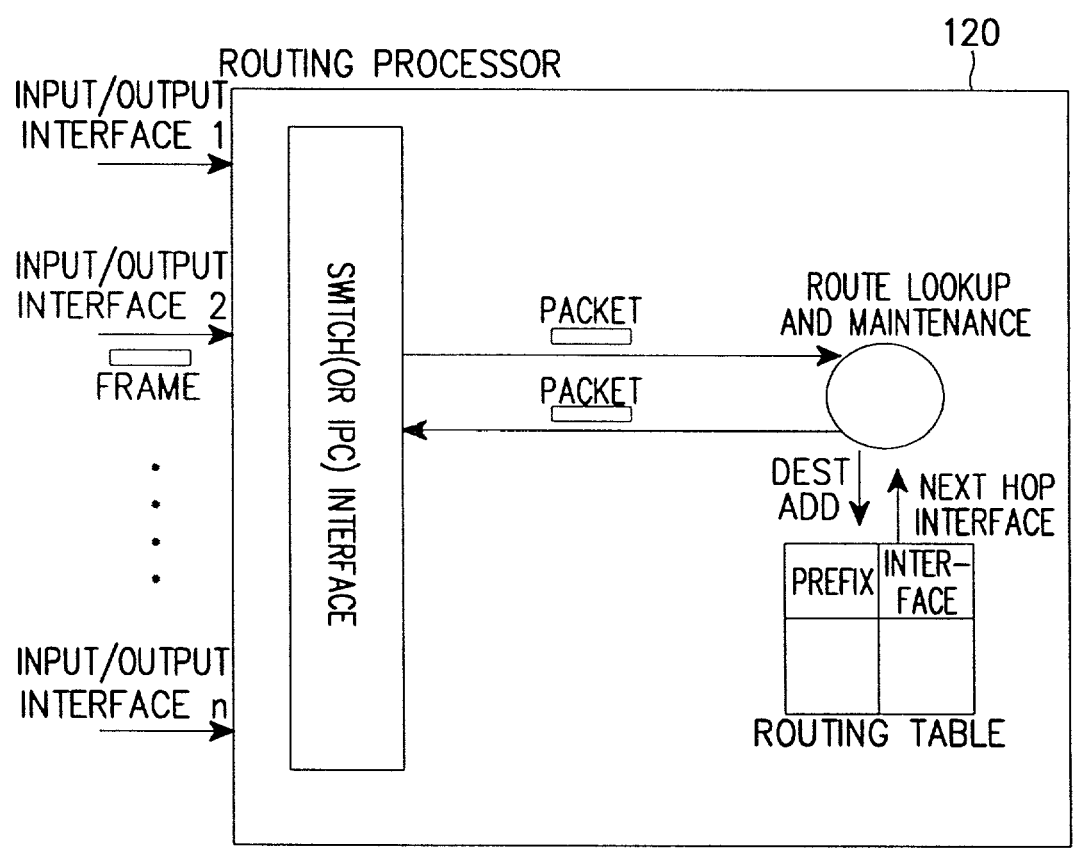
FIG. 4 is a schematic diagram illustrating a structure of a routing processor.

FIG. 3 illustrates a structure of the forwarding engine 112 in the router with a distributed or parallel architecture. FIG. 4 illustrates a structure of the routing processor 120.

Referring to FIG. 3, the forwarding engine 112 includes n input interfaces, m output interfaces, n buffers for buffering the packets input through the input interfaces, a packet classifier for classifying the packets stored in the buffers according to classes or types, and a route lookup controller for transferring the packets classified by the forwarding table and the packet classifier to the corresponding output interfaces by consulting the forwarding table.

Referring to FIG. 4, the routing processor 120 includes n input/output interfaces for receiving and outputting the packets from/to the switch fabric 130 shown in FIGS. 1 and 2, a switch interface for buffering the packets input and output from/to the input/output interfaces and interfacing between the switch fabric 130 and a route lookup and maintenance controller in its following stage, and the route lookup and maintenance controller for transferring the packets provided from the routing table and the switching interface to the corresponding input/output interface through the switch interface by consulting the routing table.

According to an RFC standard, the routing (or forwarding) table has no restriction on the array, tree and trie, which are data structure chiefly used for a lookup, nor on which algorithm is to be used to handle them. However, for longest prefix matching, a minimized number of memory accesses is required and changed routes should be readily updated in the routing (or forwarding) table.

To this end, the embodiment of the present invention uses a randomized algorithm. The randomized algorithm is an algorithm that makes random choices during its execution. It focuses on establishing that it is likely to behave well on every input. This is to process a certain input based on, not a specific hypothesis, but a probability (e.g., coin tossing) p. The advantages of using the randomized algorithm come from its simplicity and efficiency.

Figure 5:
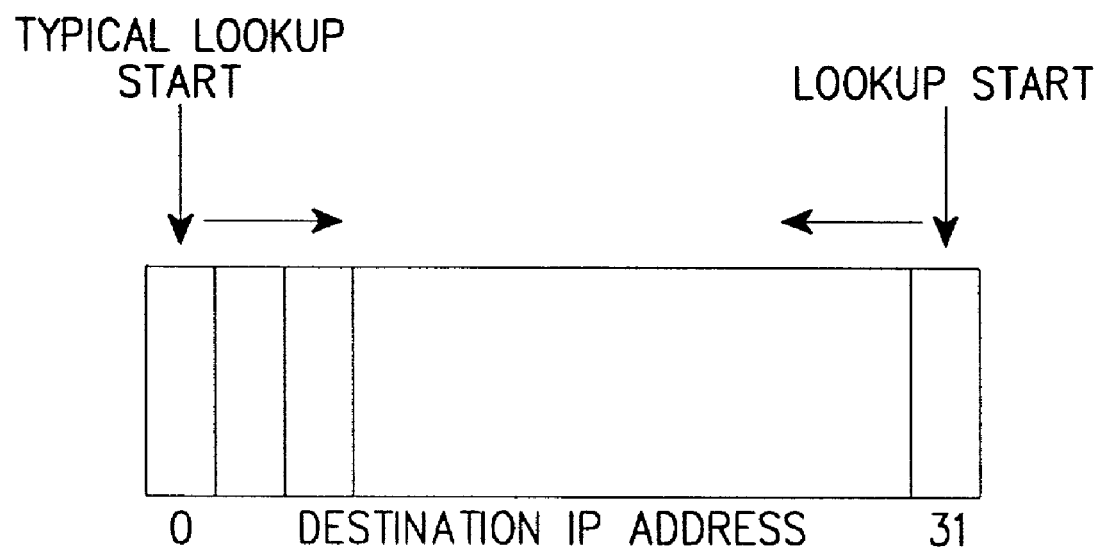
FIG. 5 is a diagram for explaining an LPM (Longest Prefix Matching) algorithm according to an embodiment of the present invention.

The algorithm according to the present invention, based on the randomized algorithm, secures the minimized number of memory accesses and simple management of the routing table. For management of the routing entries, only the changed route information is reconstructed instead of using the conventional method of restructuring the overall table. In addition, unlike the route lookup algorithm such as the general tree or binary trie, the algorithm according to the present invention searches the longest prefix from the tail of the destination IP address as shown in FIG. 5.

In addition, the present invention uses a skip list for the routing table. See Pugh, W., *Skip Lists: A Probabilistic Alternatives to Balanced Trees*, CACM 33(6), pages 6689–676, 1990.

The skip list is considered as a linked list with sorted n nodes and is usually used in the data structure on behalf of a balanced tree such as splay tree. See Sleator, D. and Taijan, R., *Self-Adjusting Binary Search Trees*, JACM, Vol. 32, No. 3, July 1985. Thus, it is simpler and more efficient than the balanced tree for insert and delete operations. The present invention proposes a variant of a skip list for longest prefix matching as shown in FIG. 6.

Figure 6:
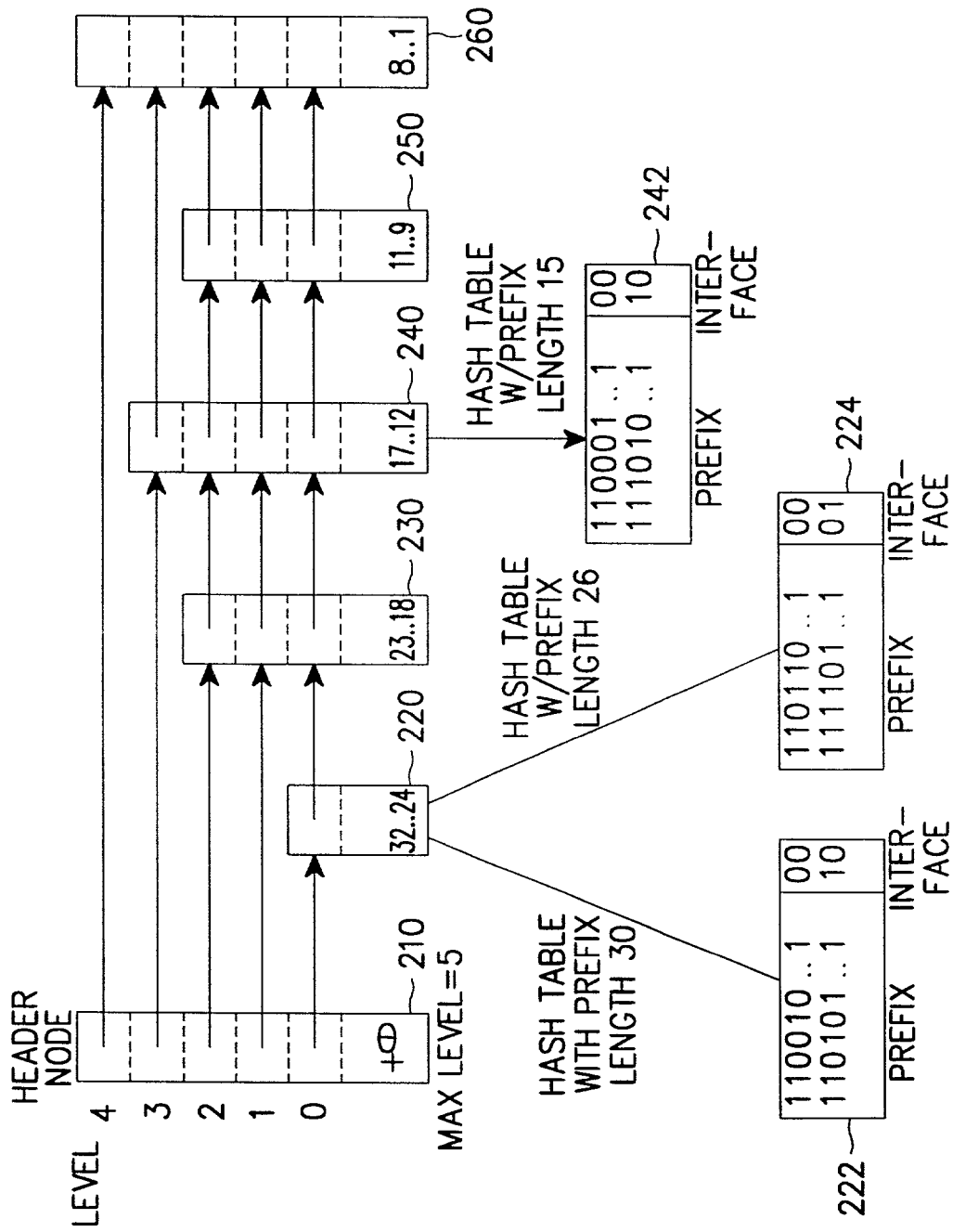
FIG. 6 is a diagram illustrating a structure of a skip list according to an embodiment of the present invention.

FIG. 6 illustrates a variant of a skip list according to an embodiment of the present invention. Referring to FIG. 6, each node has a single pointer or multiple pointers and the leftmost node is called a header node 210 because all the operations on the variant of the skip list such as lookup, insertions, deletions and updates must be started from the header node 210.

The header node 210 contains +∞ as a key value and pointer(s) to indicate the next node(s). Keys in the nodes 220, 230, 240, 250 and 260 are sorted in a descending order. A key in each node means 'prefix length range' or 'clustering of prefix length value', and the key is inserted in a descending order. In the embodiment of the invention, the search will be started from leaves to a root (or parent), i.e. an inverted key value sequence, which is an absolutely different method from the conventional trie or tree structures.

The key of the second node 220 has a prefix length range of 32–24, and any route having a prefix length belonging to this prefix length range is stored in a hash table matching its prefix length. FIG. 6 shows a hash table 222 with a prefix length of 30 bits and a hash table 224 with a prefix length of 26 bits as an example of hash tables of a router belonging to a range of the second node 220. Further, FIG. 6 shows a hash table 242 with a prefix length of 15 bits as an example of a hash table of a route belonging to a range of the fourth node 240 having a prefix length range of 17–12.

Although FIG. 6 shows an example in which the prefix length ranges of various nodes are fixed to different lengths, i.e., a fixedly divided prefix range, but the prefix length range can also be divided into a group of nodes with variable lengths, i.e., a variably divided prefix range. Srinivasan, V. and Varghese, G., *Faster IP Lookups using Controlled Prefix Expansion*, In Proceedings of ACM Sigmetrics '98 Conf., pages 1–11, 1998, discuss a dynamic programming technique to divide a prefix range to provide optimal storage. In the algorithm according to the present invention, it is possible to divide the prefix length group using a similar technique. However, in the embodiment of the present invention shown in FIG. 6, it is preferable to have a fixed prefix length range, thereby to avoid additional calculation loads due to the dynamic programming.

For the case of IPv4, if the prefix length range is fixed to 8, then the total number of inserted nodes can be 5 (1+[32/8] (where 32 is the max no. of bits in an IPv4 address)). As shown from the empirical result from IPMA (Internet Performance Measurement and Analysis), *http://nic.merit.edu/ipma*, the distribution of actual referenced prefix length has a skewed one, i.e., implying the locality pattern existing in an actual referenced prefix length distribution. Therefore, in the present invention it is possible to use a smaller number of nodes. For example, it is noted from FIGS. 7A and 7B that the prefix lengths of from 17 to 27 are most frequently referenced. Accordingly, it is possible to set one node having a prefix length key value of a range including a corresponding prefix length and set a plurality of nodes according to another prefix length range.

Referring back to FIG. 6, a variable 'MaxLevel' of the header node 210 represents the maximum level number among all the nodes belonging to the skip list, i.e., the total number of pointers at the header node to point to other nodes. Each node keeps a key value 'x->key' (or key(x)) and a pointer(s) 'x->forward[L]' (or next(x, L)) to denote a pointer from the node x to point to a neighboring node at the level L of node x.

Each key in a node, except the header node 210, has a prefix length range or set. In FIG. 6, the node 220 has route entries ranging from 32 to 24 and each prefix length has its own hash table to store route entries matching to the corresponding prefix length. If route entries exist corresponding to each prefix length ranging from 32 to 24, inclusive, then the corresponding node will have nine (9) pointers to point to nine (9) different hash tables. Each hash table only stores route entries exactly matching its prefix length. This is the reason to call a variant of skip list as a skip list with k-ary hashed node(s).

For a better understanding of the algorithm based on a skip list according to the present invention, a description will be made of a method for creating the header node and building up the variant skip list.

Figure 8:
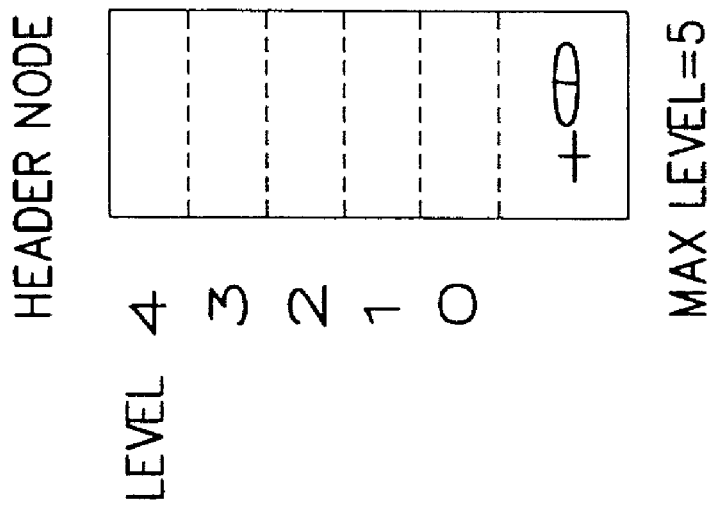
FIG. 8 is a diagram illustrating a structure of a header node according to an embodiment of the present invention.

FIG. 8 is a diagram for explaining a method for creating the header node according to an embodiment of the present invention. Referring to FIG. 8, the header node has a +∞ key value and MaxLevel=5, (1+⌈32/8⌉) where MaxLevel=1+⌊W/n⌋, W is the bit length of IP address, e.g., IPv4:32 and IPv6:128, and n is a prefix range. Since the header node has to cap all the nodes exclusively within the skip list, in the case of IPv4, MaxLevel=33 is appropriate for data structures containing up to $2^{32}$ routes if the probability p is ½ and the prefix range is equal to 1. The header node has MaxLevel forward pointers indexed 0 through MaxLevel-1. In the embodiment of the present invention, due to the clustering exploitation of the prefix range, MaxLevel=5 is required where it is assumed that the fixed prefix range is 8.

Figure 9:
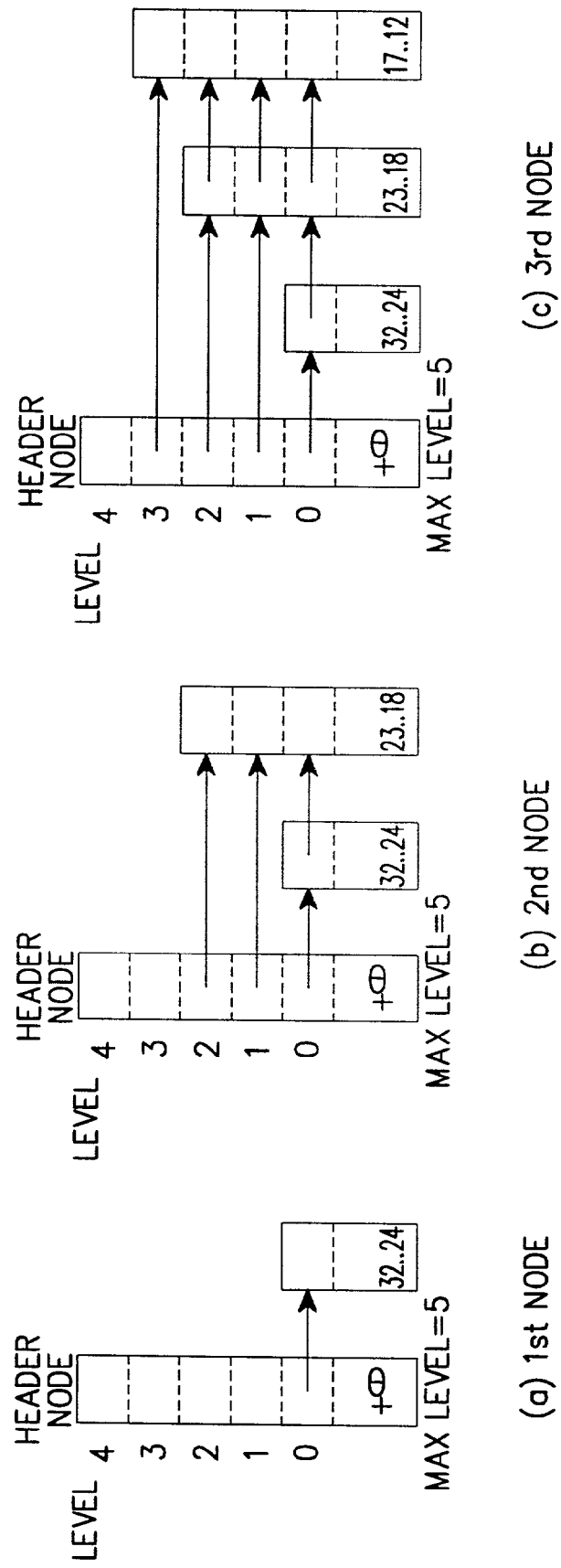
FIG. 9 is a diagram for explaining a skip list build-up operation according to an embodiment of the present invention.

After generating a header node, the construction of a variant of a skip list is shown in FIG. 9, which is a diagram for explaining an operation of constructing the skip list according to an embodiment of the present invention. If the pointer of a top level in the header node is null, i.e., if there are no adjacent nodes, i.e., subnodes connecting to the pointers of the header node, the level is decreasing by 1 until the pointer points to an adjacent node. As shown in FIG. 9, a first node (a) with prefix range value of 32–24 is created, and a pointer of a level 0 in the header node points the first node. After that, a second node (b) with a prefix range of 23–18 and a third node (c) with a prefix range of 17–12 are sequentially created. In this process, a plurality of nodes are created to cover every prefix length range.

A level of each created node is randomly set using the randomized algorithm, shown in Program 3, below, according to the present invention. A random number value of a real number belonging to (0,1) is first generated. When the generated random real number value is smaller than a preset reference probability value (herein, the reference probability is set to p=½ for generation of an ideal skip list) and a level of a corresponding node to be created is also smaller than MaxLevel, the level of the corresponding node is increased. Otherwise, a node having a level value of 0 is created.

Figure 10A:
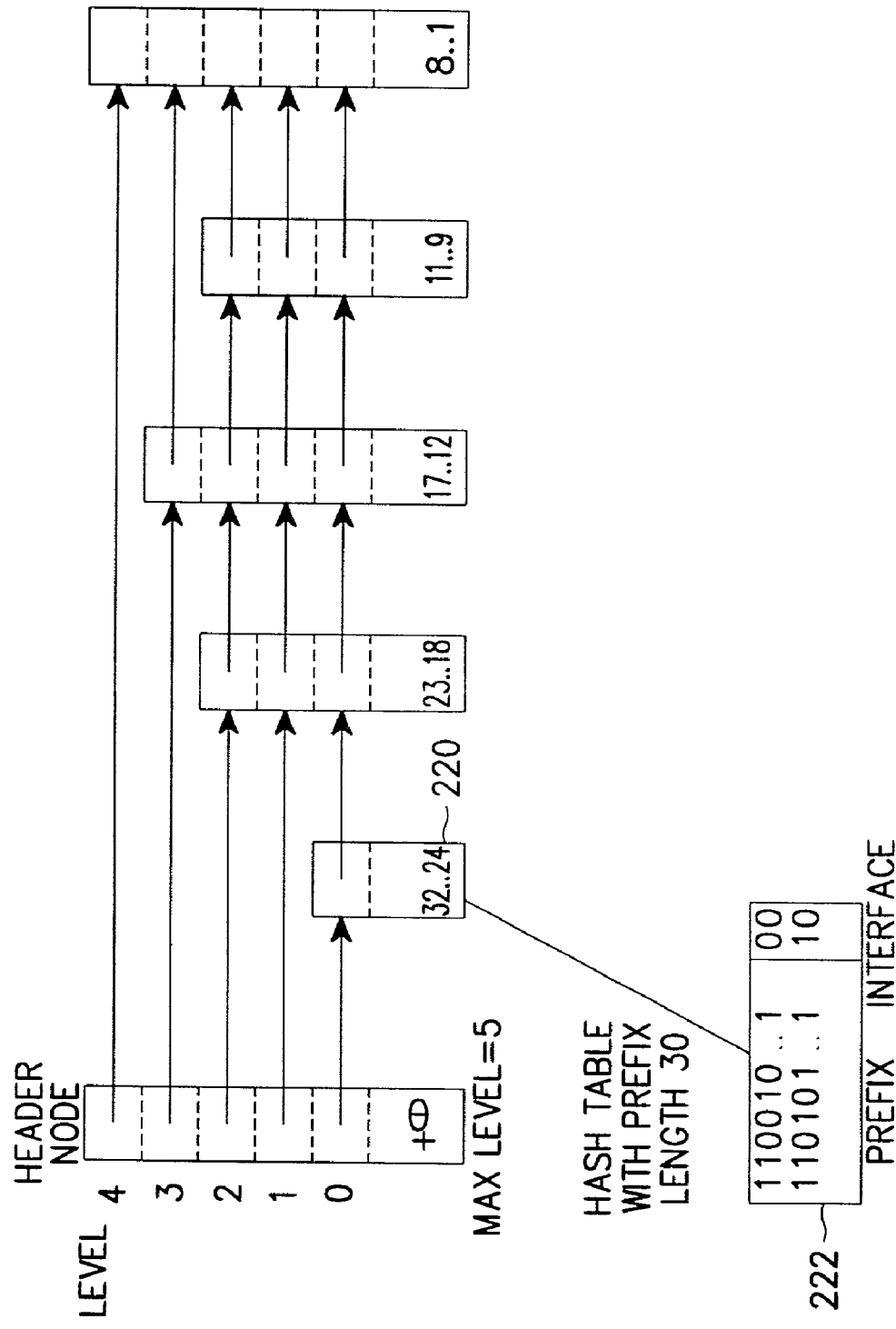
FIGS. 10A and 10B are diagrams for explaining an operation of building-up a routing table depending on prefix lengths according to an embodiment of the present invention.

In this manner, after constructing nodes with prefix ranges in a skip list, a routing table containing route entries has to be built. With reference to FIG. 10A, a description will be made of a method for constructing a routing table when a router has routes with prefix length 30.

Figure 10B:
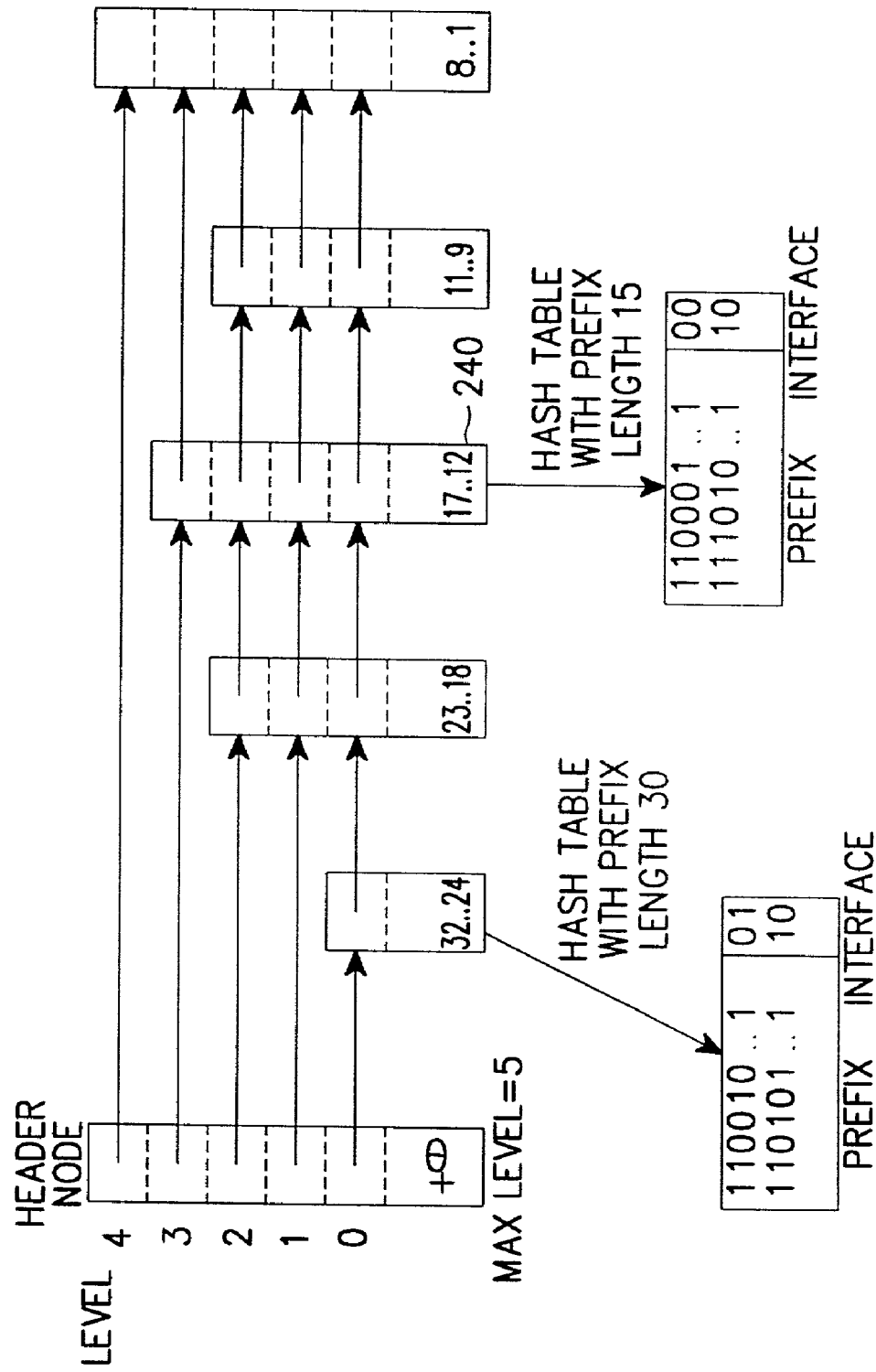

Referring to FIG. 10A, when a router has routes with a prefix length 30, the first node 220 with prefix length range of 32–24 in a skip list is searched and then route entries to be added are inserted in the form of a hash table. The node in a skip list may have different hash tables ranging from its prefix length. Following the same procedure, routes with prefix length 15 are added as shown in FIG. 10B, in which a hash table with prefix length 15 is created under the node 240 with prefix range of 17–12.

Figure 11:
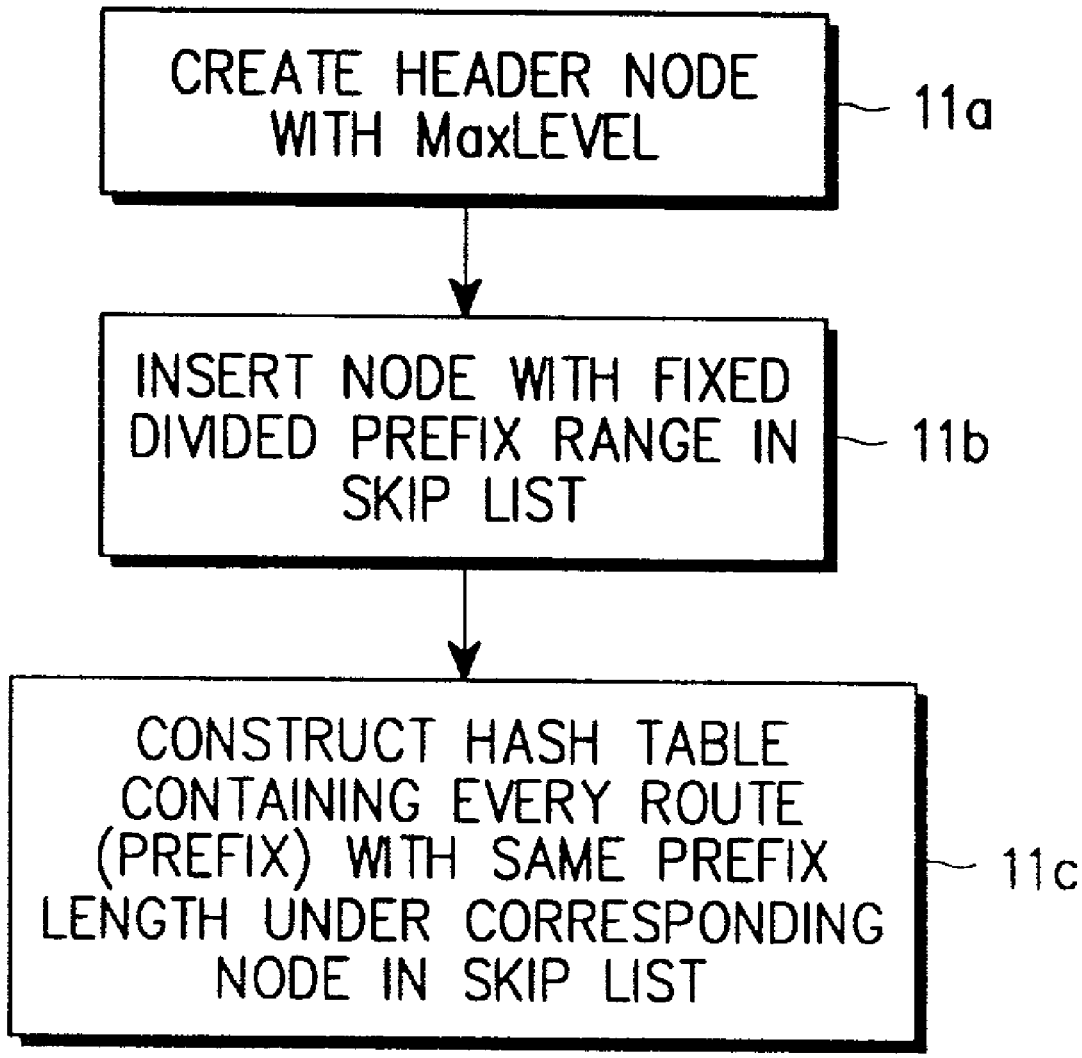
FIG. 11 is a flow chart illustrating a procedure for creating a routing table according to an embodiment of the present invention.

To recapitulate the procedures of routing table generation, the whole sequences are depicted in FIG. 11, which illustrates a procedure for constructing a routing table according to an embodiment of the present invention. In step 11a, a header node is created with MaxLevel to cap all the nodes in a skip list. Then, in step 11b, nodes with fixed divided prefix range are inserted in the list. For simplicity, although the invention proposes a fixed division of prefix range, it is also possible to speculate on an adaptive division reflecting actual prefix length distribution. Thereafter, in step 11c, a hash table for each given route entry is created under the node with the corresponding prefix range. The novel scheme according to the present invention is to provide a search starting from the routes with the longest prefix length unlike the search, common to the trie or tree structure, from the shortest prefix length.

Figure 12:
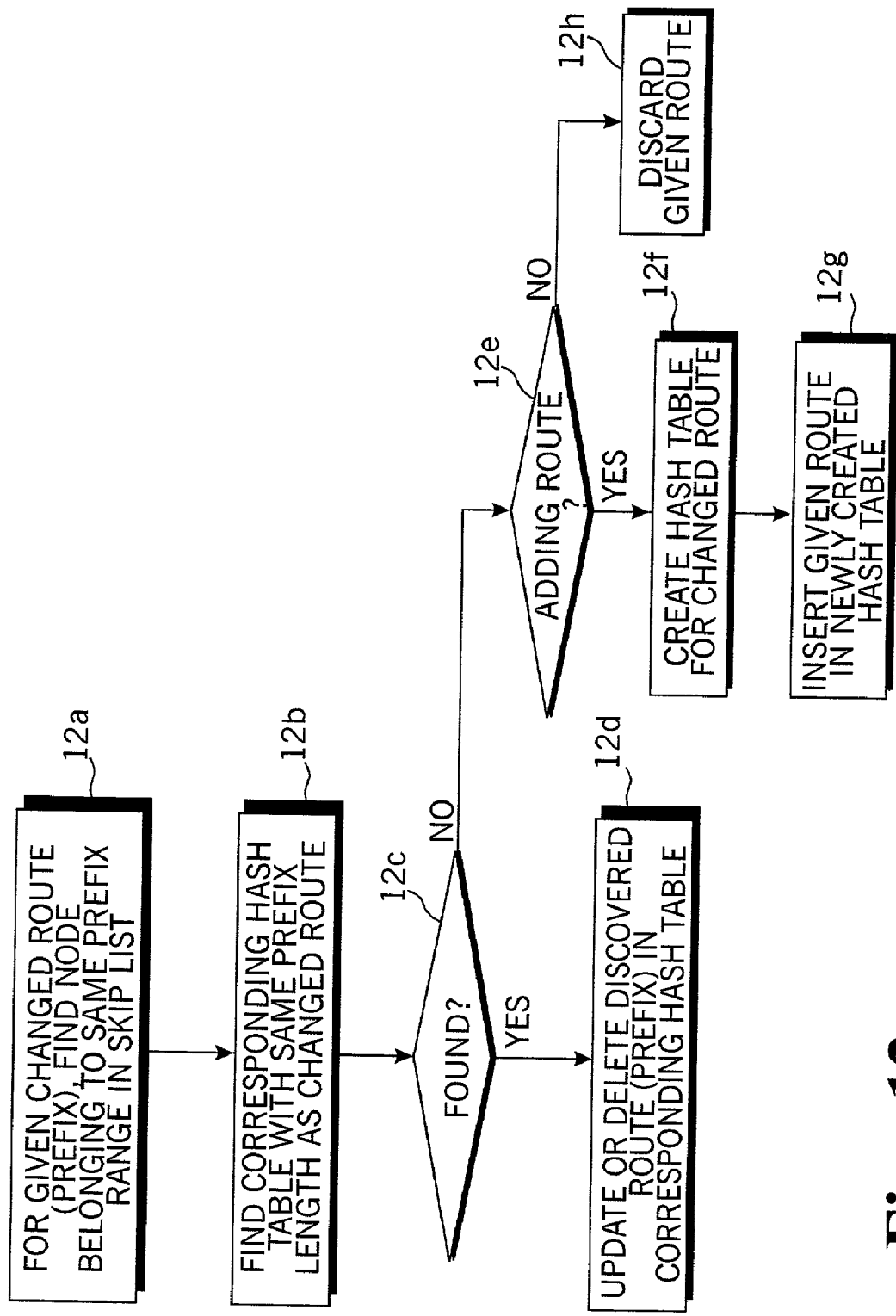
FIG. 12 is a flow chart illustrating a procedure for updating a routing table according to an embodiment of the present invention.

A router often receives route changes from its connected one(s). These changes must be reflected into the current routing (or forwarding) table. The updating sequences in the novel scheme is are represented in FIG. 12. For a given changed route (prefix) to be reflected in a routing table, a node matching to the prefix length is to be discovered in step 12a. Thereafter, in step 12b, a hash table corresponding to the same prefix length as the changed route's prefix length is searched for. If a corresponding hash table is found, step 12c, the procedure goes to step 12d where the discovered route in the corresponding hash table is updated or deleted. If the hash table does not exist in step 12c, then the next step goes to step 12e. If the route is to be added, then the procedure goes to step 12f where a hash table having the same prefix length as the changed route's prefix length is created. Thereafter, in step 12g, the changed route is inserted into the newly created hash table. Otherwise, in step 12h, the changed route is discarded.

Figure 13:
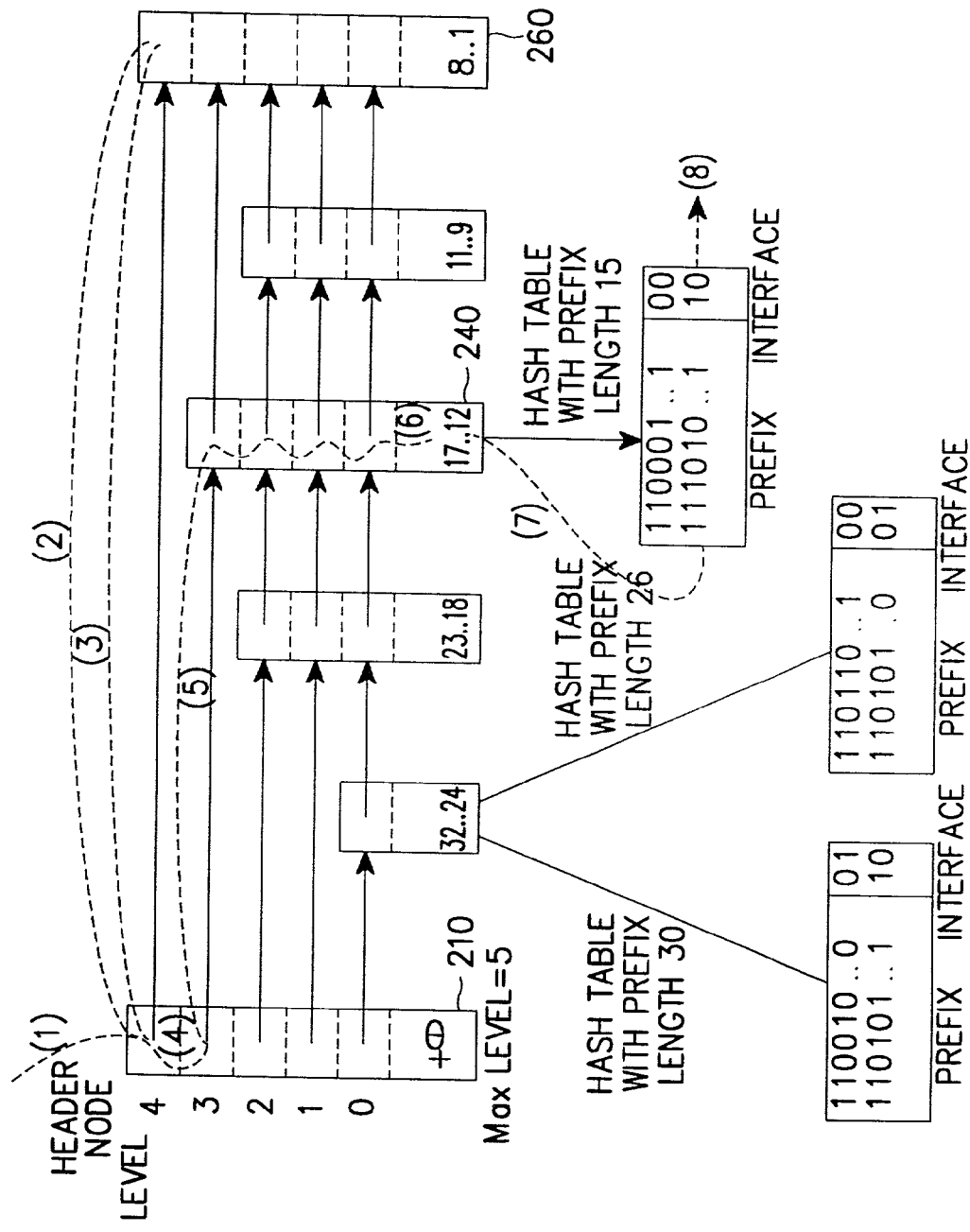
FIGS. 13 and 14 are diagrams illustrating skip list structures for explaining route lookup and update operations according to an embodiment of the present invention.
Figure 14:
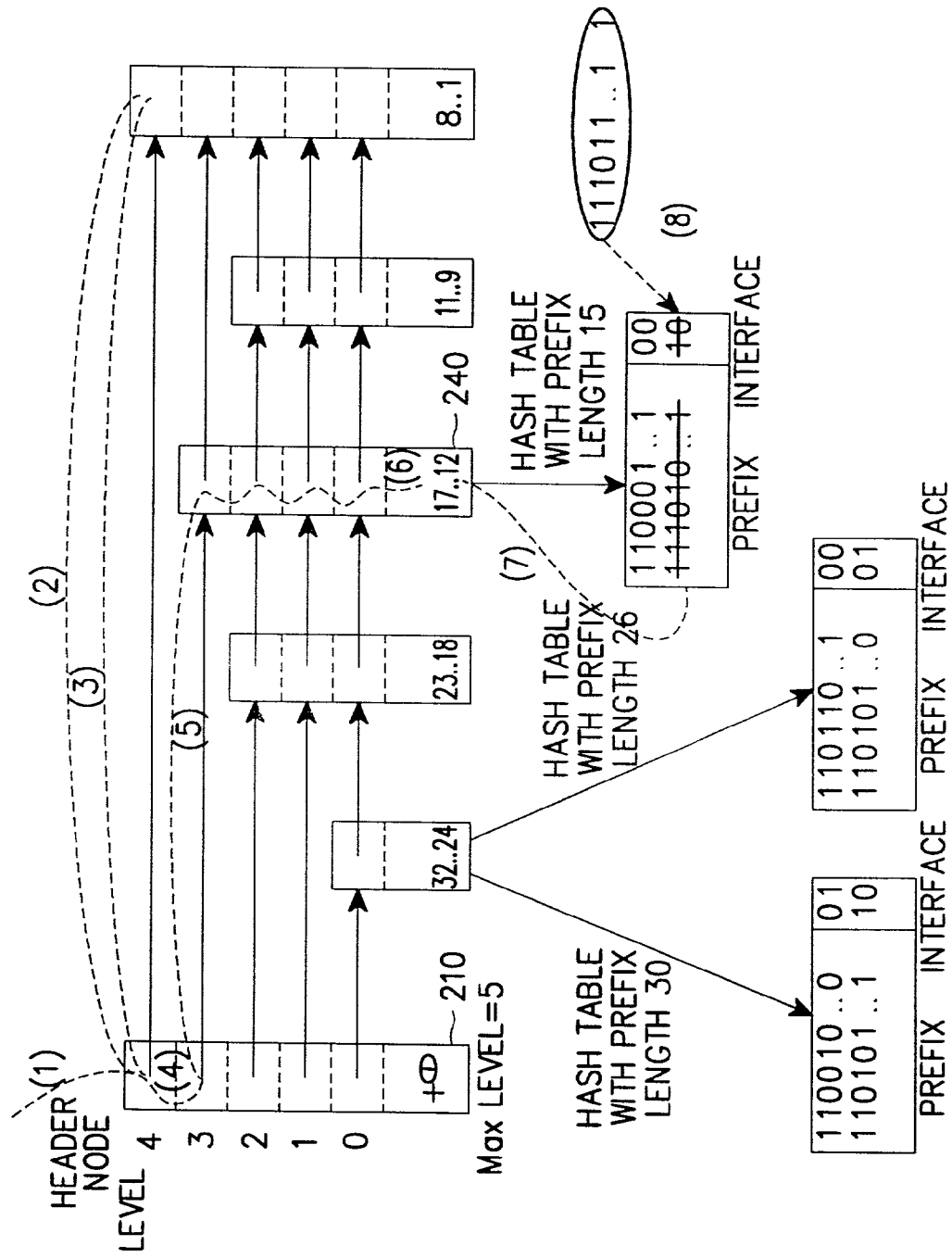

FIGS. 13 and 14 are diagrams for explaining the procedures for searching and updating the routes according to an embodiment of the present invention.

First, a procedure for searching a route with prefix length 15 will be described with reference to FIG. 13. The node with the same prefix length (15) has to be found. The search is started from the top level (i.e., level 4) of header node 210 (sequence (1) of FIG. 13). The pointer of level 4 points to the next node having a level 4, i.e., node 260 with prefix length range (key) of 8–1 (sequence (2) of FIG. 13). Thereafter, the comparison of the route's prefix length with the key of node 260 is performed. The key value is not matched and the search returns to the same level (i.e., level 4) of header node 210 (sequence (3) of FIG. 13). The level of the header node 210 is decreased by one (sequence (4) of FIG. 13) and the pointer of the next level (level 3) points a the next node having a level 3, i.e., node 240 with a key of 17–12

(sequence (5) of FIG. 13). When the matching key value is found in node 240 (sequence (6) of FIG. 13), a hash table corresponding to the changed route's prefix length is searched for (sequence (7) of FIG. 13). If the hash table exists, a next hop (sequence (8) of FIG. 13) is performed. If the hash table does not exist, the hash table has to be created for adding a new route.

FIG. 14 illustrates several sequences where a route having a prefix '111010 . . . 1' with next hop interface '10' is to be deleted from a hash table or changed to '111011 . . . 1' with a next hop '1'. The procedure for searching the corresponding prefix (111010 . . . 1) is performed in a similar manner as shown in FIG. 13.

Now, a route lookup procedure for searching a route of a specific destination IP address from the routing table will be described in detail with reference to FIGS. 15 and 16.

Figure 15:
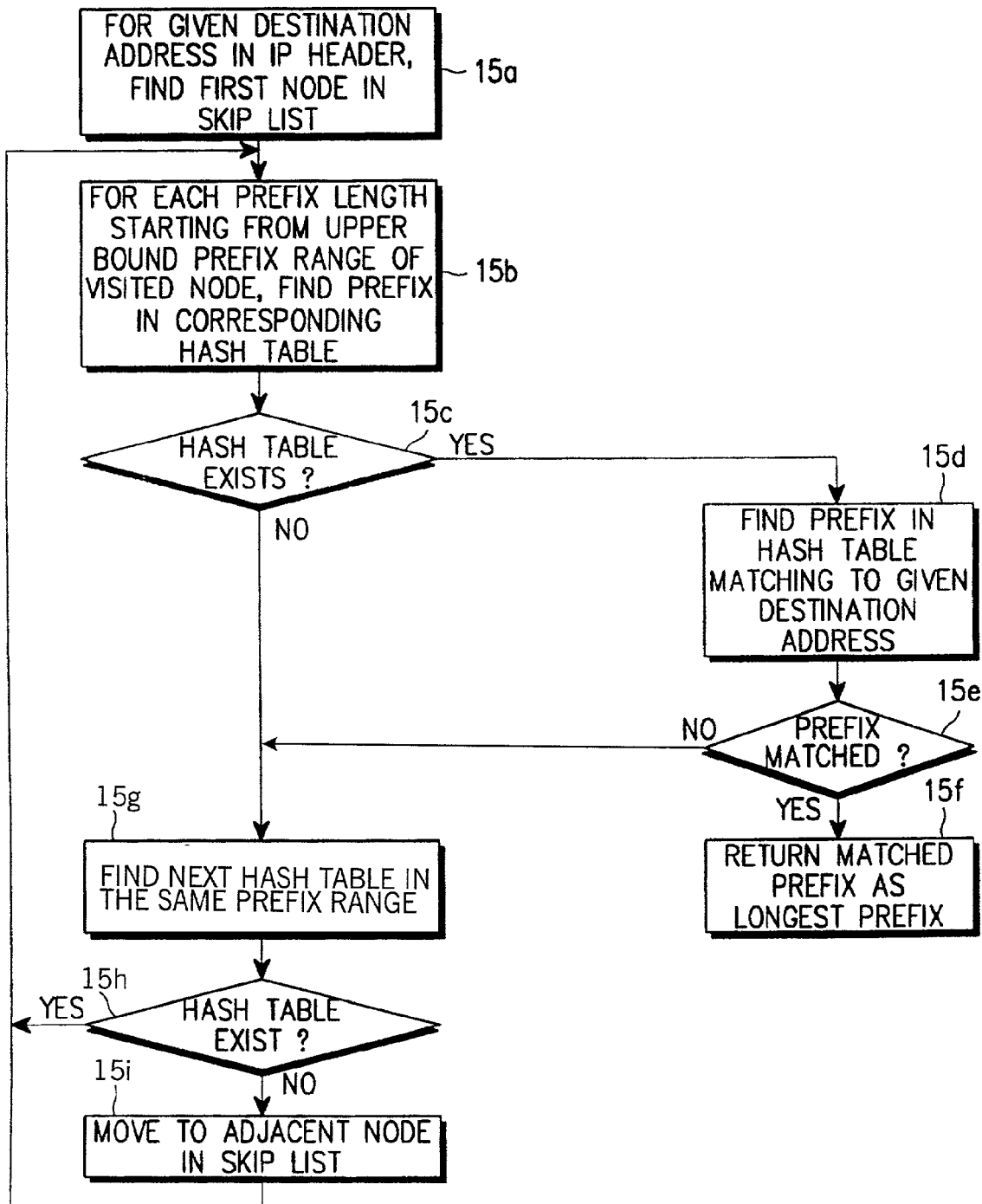
FIG. 15 is a flow chart illustrating a route lookup process according to an embodiment of the present invention.
Figure 16:
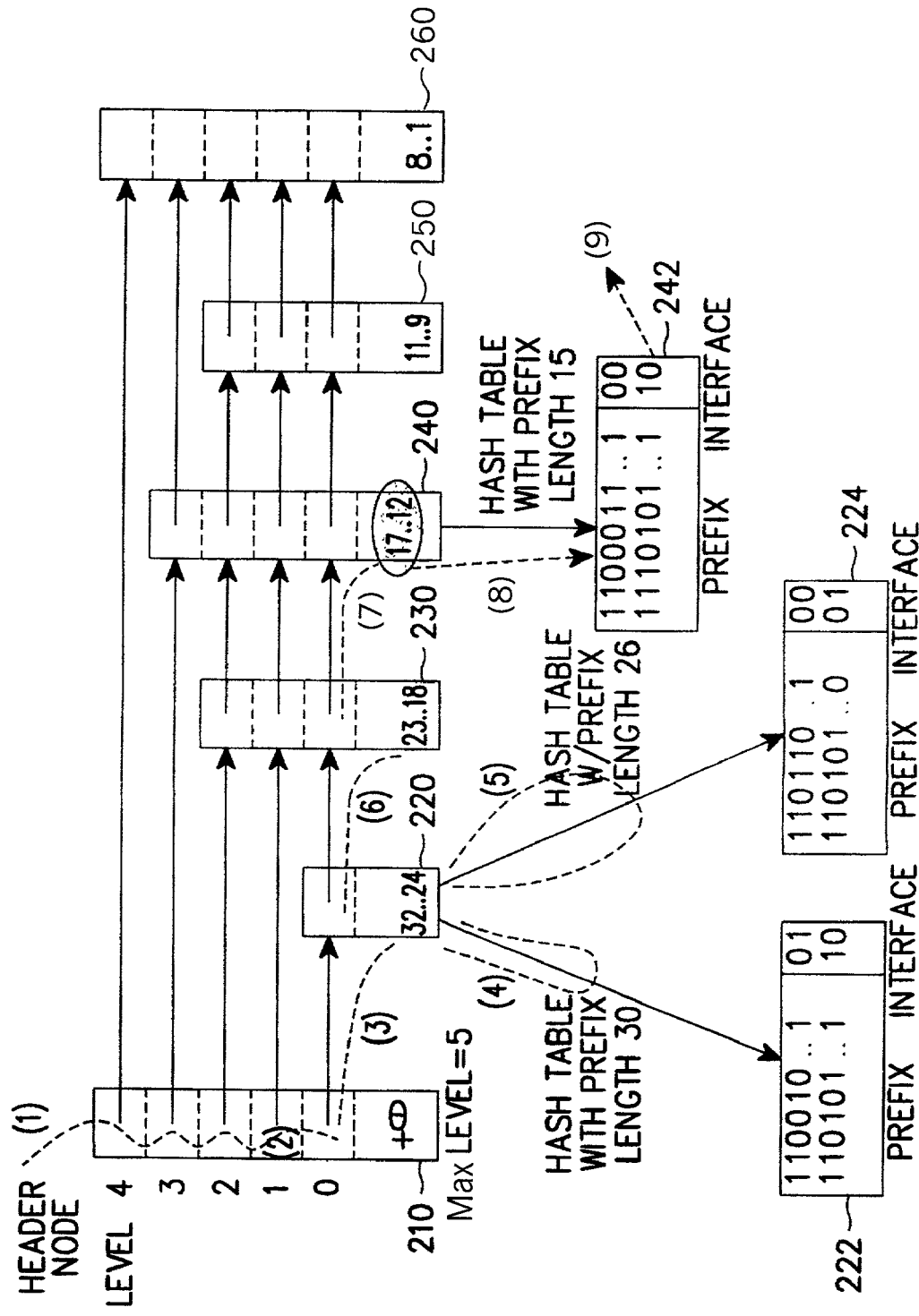
FIG. 16 is a diagram illustrating a skip list structure for explaining the overall lookup process according to an embodiment of the present invention.

FIGS. 15 and 16 illustrate a route lookup procedure, defined as a longest prefix matching scheme, according to an embodiment of the present invention. The search based on the longest prefix matching scheme means that the route entry has to be compared from the longest prefix, e.g. prefix length 32 in IPv4. FIG. 16 is a diagram for explaining the whole lookup scheme according to an embodiment of the present invention, wherein a destination address has a prefix length 15 of '1110101 . . . 1'.

In step 15a of FIG. 15, for a given destination address encapsulated in an IP header, the first node in a skip list is looked for, thus the route lookup given by the destination address is started (sequence (1) of FIG. 16) from level 4 of the header node 210, and the level in the header node 210 is decreased by one down to the level 0 (sequence (2) of FIG. 16), and level 0 has a pointer pointing to first node 220 (sequence (3) of FIG. 16).

Then the hash tables of first node 220 are searched, step 15b, starting from the upper key value of the prefix length range, e.g. 32 (current prefix length). If a hash table does not exist, the procedure goes to step 15g. Otherwise, if a hash table in step 15c exists, the procedure goes to step 15d. In step 15d, the prefixes in the found hash table are searched for one corresponding to the destination address. If a found prefix is determined to match the destination address, step 15e, the matched prefix is returned as a longest prefix in step 15f. Meanwhile, if the prefix is not matched in step 15e, the procedure proceeds to step 15g.

In step 15g, the procedure finds a next hash table in the same prefix range. If a next hash table exists in step 15h, the procedure returns to step 15b to repeat the above process. If a next hash table does not exist in step 15h, the procedure goes to step 15i where it moves to the adjacent node in a skip list, and then returns to step 15b to repeat the above process in the adjacent node. As described above, unlike the conventional search scheme starting from the root node, the novel scheme is based on the search starting from the longest prefix range with its own hash table.

Looking again to FIG. 16, first, a node is searched in a skip list as previously mentioned and the route lookup given by a destination address is started from the header node (sequence (1) of FIG. 16). The level in the header node 210 is decreasing down to the level 0 (sequence (2) of FIG. 16) where the pointer points to the node having the longest prefix range, and then the first node 220 pointed by the pointer of the header node 210 is traversed (sequence (3) of FIG. 16). Thereafter, first node 220 is searched to find a hash table containing prefixes of length 32. If a corresponding hash table is found then the destination address is compared to the prefixes in the hash table to find a match. If no hash table containing prefixes of length 32 is found first node 220. Since each node in the skip list maintains a pointer array which points to each hash table in the nodes prefix range, then if no hash table containing prefixes of length 32 exists it corresponding pointer will be null.

In the example of FIG. 16, first node 220 has only two hash tables 222 and 224, respectively corresponding to prefix length 30 and to prefix length 26. Accordingly, when first node 220 is searched to find a hash table, each pointer in the prefix range is checked, and pointers having a null value are skipped. The hash tables corresponding to pointers not having a null value will be compared to the original destination address to find a match.

Thus, the first pointer not having a null value will point to hash table 222 and the destination address is compared to the prefixes in hash table 222 (sequence 4 of FIG. 16). If the destination address is not found in hash table 222, then the next hash table with a non-null pointer, i.e., hash table 224 with a prefix length 26, is compared with the destination address (sequence 5 of FIG. 16). If the destination address is not yet found, and there are no more hash tables in first node 220, then the lookup has failed with respect to node 220.

When the lookup has a failure in node 220, a pointer pointing to the next node in the skip list having the next longest prefix range is searched for. In this example, there is a pointer indicating that the next node in the skip list having the next longest prefix range is node 230 (sequence (6) of FIG. 16). Accordingly, node 230 is checked to see if it has any hash tables, and since there are none, a pointer in node 230 pointing to the next node in the skip list is searched for. In this case, it moves to an adjacent node 240 in the skip list (sequence (7) of FIG. 16) and a pointer pointing to hash table 242 is found according to the steps set forth in FIG. 15. The destination address is compared with prefixes in hash table 242 with prefix length 15 (sequence (8) of FIG. 16). When the match happens, then the route lookup operation is terminated successfully (sequence (9) of FIG. 16). If the destination address cannot be found even in the last hash table of the last node 260, the lookup is failed, and the packet with the corresponding address is sent to the route with a default route entry.

The constructions of the skip list are represented in Programs 1, 2 and 3; reflecting the change of route entries into the skip list is also shown in Programs 4, 5, 6 and 7; and an essential part of the novel algorithm, route lookup, is shown in Program 8.

---

Program 1: Buildup operation
var px: bitstring init b'0'; (* prefix *)
    interface: integer init 0; ( *next hop interface *)
    W: integer init 32; (* # of address bits, IPv4 *)
    k: interger init 8; (* fixed prefix range, e.g., 8, or a variable prefix range from 0 to W *)
    hrange: integer init W; (* upper bound of prefix range *)
    lrange: integer init W−k+1; (* lower bound of prefix range *)

-continued

```
        MaxLevel: integer init ⌈lg(W/k)⌉; (* assuming p=½ (where p is a probability which
        determines the possibility of creating a node with more levels or not) *)
        Buildup(list) (* constructing a skip list *)
            begin
                L := ⌈W/k⌉ (* L is an integer equal to the ceiling of W/k and closely related to
                the
                number of nodes to be generated *);
                while L ≧ 0 do
                    Insert_Node (list, hrange, lrange);
                    L := L−1
                    hrange := lrange−1;
                    lrange := lrange−k+1;
                end while
            end
Program 2: Inserting a node in a skip list
Insert-Node (list, hrange, lrange) (* inserting a node *)
    begin
        update [0..MaxLevel];
        x := list → header
        for i := list → level downto 0 do
            while [hrange, lrange] ∈x → forward[i] → key do
                x := x → forward[i]
            end while
            update[i] := x;
        end for
        x := x → forward[0];
        if[hrange, lrange] ∈ x → key then
            x → value:=[hrange, lrange];
        else
            v := RandomLevel()
            if v > list → level then
                for i := list → level + 1 to v do
                    update[i] := list → header;
                end for
                list → level := v;
            end if
            x:=MakeNode(v, [hrange, lrange]);
            for i := 0 to level do
                x → forward[i] := update[i] → forward[i];
                update[i]→ forward[i] := x;
            end for
        end if
    end
Program 3: Randomizing level
RandomLevel() (* randomly deciding a level of a node *)
    begin
        v := 0;
        r := Random(); (*r ∈ [0, 1) *)
        while r < p and v < MaxLevel do
            v := v+1;
        end while
        return v;
    end
Program 4: Search operation
Search(list, px) (* searching for a node with prefix px in a skip list *)
    begin
        x := list → header;
        for i := list → level downto 0 do
            while px ∈x → forward[i] → key do
                x := x → forward[i];
            end while
        end for
        x := x → forward[0];
        if x → key = px then
            for j := hrange downto lrange−1 do
                if hash-get (j,px);
                    return hash-get (j, px);
                end if
            end for
            return error
        end if
    end
Program 5: Insert Operation
Insert(list, prefix, interface) (* inserting a route entry *)
    begin
        if hash-insert (list, prefix, interface) then
        else
```

-continued

```
                return error;
            end if
    end
                        Program 6: Delete operation
Delete(list, prefix, interface) (* deleting a route entry *)
    begin
        if search (list, prefix) then
            hash-delete (prefix, interface);
        else
            return error;
        end if
    end
                        Program 7: Update a route entry
Update(list, prefix, interface) (* updating a route entry *)
    begin
        if search (list, prefix) then
            hash-update (prefix, interface);
        else
            return error;
        end if
    end
                        Program 8: Lookup operation
Lookup(list, destaddr) (* looking for a rout with the longest prefix *)
    begin
        x := list → header;
        x := x → forward[0];
        for i := ⌈W/k⌉ downto 0 do
            for j := hrange downto lrange−1 do
                if compare(destaddr, hash-get (j, destaddr)) then
                    return hash-get (j, destaddr);
                end if
            end for
            x := x → forward[i];
        end for
        return error;
end
```

Figure 7A:
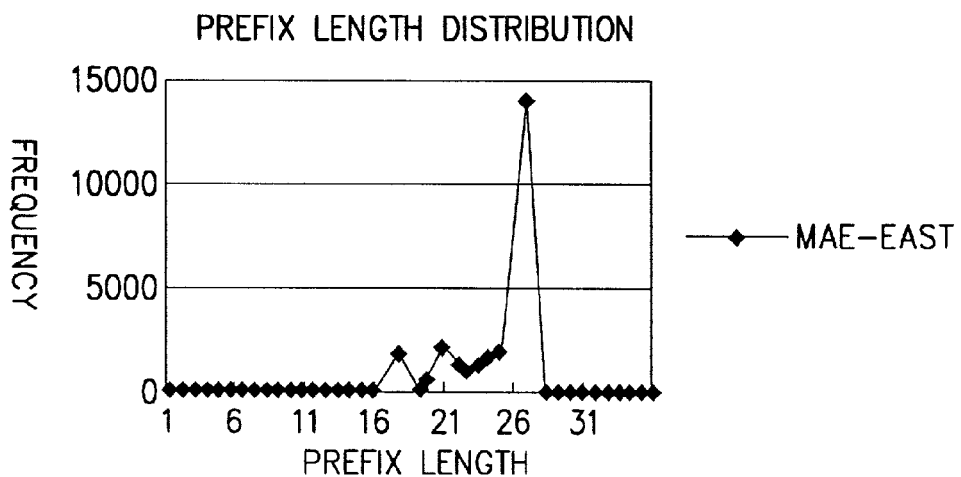
FIGS. 7A and 7B are graphs illustrating measured values of prefix length distributions in the Internet.
Figure 7B:
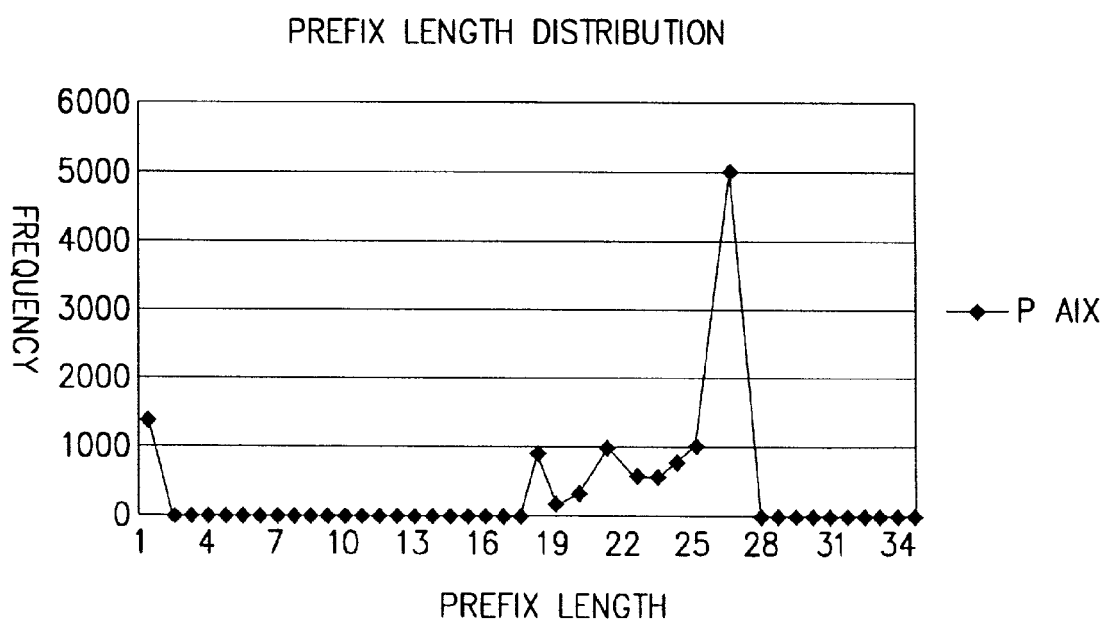

Now, efficiency of the routing technique according to the present invention will be described with reference to the accompanying drawings. FIGS. 7A and 7B are graphs representing measured values of the prefix length distributions in the Internet. The data represented by the graphs of FIGS. 7A and 7B indicates data collected in the recent MAE-EAST NAP (Network Access Point) in an IPMA (Internet Performance Measurement and Analysis) project.

The statistical data collected in the IPMA project is widely used as source data for mutually analyzing the research results by a route lookup algorithm designer. At present, a router in the MAE-EAST NAP contains the largest number of route entries and is chiefly used as a model of a backbone router. A PAIX NAP contains the smallest number of route entries collected in the current IPMA project, and is chiefly used as a model of an enterprise router.

FIGS. 7A and 7B show locality patterns, indicating that the prefix length of 16–28 is most frequently referenced. Therefore, the observed result implies that the nodes to be contained in the modified skip list proposed in the invention will be considerably decreased in number. Another interesting thing in the IPMA ((Internet Performance Measurement and Analysis), http://nic.merit.edu/ipma) is that the number of routing prefix added or withdrawn by the BGP one day reaches 1,899,851 (as of Nov. 1, 1997). This is so impending as to request 25 prefix-updates/sec, and rapidly reflecting the changed routing prefix into the routing (or forwarding) table is an important factor in addition to a search time.

Now, with reference to Table 2, a description will be made of a difference between the novel algorithm and conventional algorithms. In general, for analysis of an algorithm, a worst-case complexity for a time required in processing a corresponding algorithm or for a memory in use is mutually compared using a big-O notation. Table 2 shows complexity required by the novel algorithm according to the present invention, where there exist N route entries, W address bits are required to express each address, and k is an algorithm-dependent constant.

TABLE 2

|  | Build | Insert | Delete | LPM Search | Memory |
|---|---|---|---|---|---|
| Array | $O(N)$ | $O(N^2)$ | $O(N^2)$ | $O(N)$ | $O(N)$ |
| Hash table | $O(N)$ | $O(1)$ | $O(1)$ | $O(N)$ | $O(N)$ |
| Binary search tree | $O(N \lg N)$ | $O(N)$ | $O(N)$ | $O((\lg(2N)))$[a] | $O(N)$ |
| Trie | $O(NW)$ | — | — | $O(W)$ | $O(NW)$ |
| Radix trie | $O(NW)$ | — | — | $O(W)$ | $O(N)$ |
| PATRICIA trie | $O(NW)$ | — | — | $O(W^2)$ | $O(N)$ |
| DP trie | $O(NW)$ | $O(W)$ | $O(W)$ | $O(W)$ | $O(N)$ |
| LC trie | $O(NW)$ | — | — | $O(W)$ | $O(N)$ |

TABLE 2-continued

| | Build | Insert | Delete | LPM Search | Memory |
|---|---|---|---|---|---|
| Hashed radix tree | O(NW) | — | — | O(W/k) | O(NW) |
| Basic BST scheme without backtracking | O(NlgW) | O(lgN) | O(lgN) | O(lgW) | O(NlgW) |
| Asymmetric BST | O(NlgW) | O(N) | O(N) | O(lgW) | O(NlgW) |
| Rope search | O(NW) | O(N) | O(N) | O(lgW) | O(NlgW) |
| Ternary CAMS | O(N) | O(l) | O(l) | O(l) | O(N) |
| Complete prefix tree | O(NlgW) | — | — | O(W/k) | O(N) |
| Binary hash table search | O(NlgW) | — | — | O(lg(W)) | O(N) |
| Multiway and multicolumn search | O(NW) | O(N) | O(N) | O($\log_k N$) | O(N) |
| Large memory architecture | O(N) | — | — | O(W/k) | O(N) |
| Skip list | O(NlgN) | O(lgN) | O(lgN) | O(NlgN) | O(N) |
| Ours | O(Nlg(W/k)) | O(lg(W/k)) | O(lg(W/k)) | O(W) | O(N) |

In Table 2, to avoid confusion from other logarithms with a base 10, lg denotes a logarithm with base 2.

In the case of IPv4, W corresponds to 32, and 128 for IPv6. In the MAE-EAST and PAIX NAPs, the number N of the route entries is approximately 50,000 and 6,000, respectively. In this case, k in a skip list with k-ary hashed nodes is 4, if prefix range is equal to 8. It amounts to be 16 for IPv6 case.

The novel algorithm is better than the conventional search tree and tries (Patricia trie or LC-trie) in comparisons with routing table construction, insert, and delete operations. Furthermore, the novel algorithm according to the present invention is superior to the binary hash table search (Waldvogel, M., Varghese, G., Turner, J. and Plattner, B., *Scalable High Speed IP Routing Lookups*, In Proceedings of ACM SIGCOMM '97, Cannes, France, pages 25–37, 1997) and the complete prefix trie (Tzeng, H. and Pryzygienda, T., *On Fast Address-Lookup Algorithms*, IEEE Journal on Selected Areas in Communications, Vol. 17, No. 6, pages 1067–1082, June, 1999) in terms of the build-up time and the insert or delete operation. In addition, it is noted from Table 2 that the complexity results indicate that the novel algorithm outperforms a pure skip list.

As described above, the algorithm according to present invention creates nodes according to a prefix range of an IP address using a skip list and a hash table, which constitute a randomized algorithm. Further, the present invention provides a routing method using a skip list in which a route entries are stored in the form of a hash table according to a prefix length set at each node, thereby minimizing a route lookup time and efficiently manage the relevant table. By doing so, it is possible to perform high-speed route lookup. This algorithm can also be applied to IPv6 which will be used in the future router.

In addition, it is noted from the complexity analysis results that the novel algorithm is superior to other conventional algorithms in every respect, especially in terms of construction, insert, and delete operations of the routing (or forwarding) table. Furthermore, on the current trend of a contemporary architecture such as a distributed router architecture or a parallel router architecture where a forwarding table in a forwarding engine is still separated from a routing one in a routing processor, by transferring only updated routes along the paths into the router instead of the whole route entries, memory bandwidth or system bus contentions may be relieved. In addition, the reduction of lookup time and the maintenance of the consistent routing information over all the routing related tables may contribute to the performance enhancement over other factors such as QoS (Quality of Service), multicasting, IPSec, and others.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for constructing routing/forwarding tables for an IP (Internet Protocol) address lookup using a skip list, comprising the steps of:
    dividing a prefix length range of an IP address in a preset method;
    creating a header node having a maximum level based on a number of clusters divided into the prefix length range, the header node pointing every node in the skip list; and
    creating subnodes by the number of the divided clusters, the subnodes each having the divided prefix length range as a key.

2. The method as claimed in claim 1, further comprising the step of storing route entries corresponding to the respective prefix lengths in a corresponding prefix length range in hash tables provided according to the prefix lengths in each subnode.

3. The method as claimed in claim 2, wherein the route entries are comprised of 32 bits or 128 bits.

4. The method as claimed in claim 1, wherein a level of the header node of the subnode is randomly set.

5. The method as claimed in claim 1, wherein the prefix length range is divided fixedly or variably.

6. The method as claimed in claim 1, the prefix length range is divided such that every prefix length range is covered through the subnodes.

7. The method as claimed in claim 1, wherein the routing/forwarding tables are included in a routing processor and a forwarding engine, respectively.

8. A method for creating IP routing/forwarding tables using a skip list, comprising the steps of:
    creating a header node for pointing each node to handle every node in the skip list;
    creating a plurality of subnodes having as a key a prefix range of an IP address divided in a preset method; and
    creating hash tables according to prefix lengths to store route entries according to prefix lengths in a corresponding prefix length range in each subnode.

9. The method as claimed in claim 8, further comprising the step of storing route entries matching to a corresponding prefix in the hash tables.

10. The method as claimed in claim 8, wherein a level of the header node of the subnode is randomly set.

11. The method as claimed in claim 8, wherein the prefix length range is divided fixedly or variably.

12. The method as claimed in claim 8, wherein the prefix length range is divided such that every prefix length range should be covered through a plurality of subnodes.

13. The method as claimed in claim 8, wherein the route entries are comprised of 32 or 128 bits.

14. The method as claimed in claim 8, wherein the header node has a +∞ key value and forward pointer(s) indexed 0 through a maximum level minus one.

15. The method as claimed in claim 8, wherein the routing/forwarding tables are included in a routing processor and a forwarding engine, respectively.

16. A method for searching routing/forwarding tables using a skip list in which route entries are stored in a form of a hash table according to a prefix length set in each node created according to assignment of a prefix range of an IP address, comprising the steps of:
   finding a node in which a prefix range corresponding to a prefix length of a route to be searched is set;
   finding a hash table with the same prefix length as the route to be searched in the found node; and
   finding the search route from the found hash table.

17. The method as claimed in claim 16, wherein the node finding step comprises the steps of:
   finding a node for pointing from a maximum level of the header node of the skip list;
   comparing a prefix length range of the found node with a prefix length of the search route; and
   finding a node pointed at a next level of the header node when the prefix length of the search route does not correspond to the prefix length range of the found node.

18. The method as claimed in claim 16, wherein the skip list includes a header node and a plurality of nodes each having a key in a range preset in a descending order and storing route entries corresponding to the respective prefix lengths in the hash tables associated with the respective prefix lengths.

19. The method as claimed in claim 16, wherein the routing/forwarding tables are included in a routing processor and a forwarding engine, respectively.

20. The method as claimed in claim 16, wherein the route entries are comprised of 32 bits or 128 bits.

21. A method for updating routing/forwarding tables using a skip list in which route entries are stored in a form of a hash table according to a prefix length set in each node generated according to a prefix length range of an IP address, comprising the steps of:
   finding a node in which a prefix range corresponding to a prefix length of a route to be updated is set;
   searching a hash table having a same prefix length as that of the route to be updated in the found node; and
   updating a corresponding route in the hash table, when the hash table is found.

22. The method as claimed in claim 21, wherein the node finding step comprises the steps of:
   finding a node for pointing from a maximum level of the header node of the skip list;
   comparing a prefix length range of the found node with a prefix length of the route to be updated; and
   finding a node pointed at a next level of the header node when the prefix length of the route to be updated does not correspond to the prefix length range of the found node.

23. The method as claimed in claim 21, wherein the route updating step comprises the step of adding, changing or deleting the route to be updated.

24. The method as claimed in claim 21, further comprising the steps of
   creating a hash table having the same prefix as the route to be updated, when the hash table is not found; and
   inserting the route to be updated in the created hash table.

25. The method as claimed in claim 21, wherein the skip list comprises a header node and a plurality of nodes each having a key in a range preset in a descending order and storing route entries corresponding to the respective prefix lengths in the hash tables associated with the respective prefix lengths.

26. The method as claimed in claim 21, wherein the routing/forwarding tables are included in a routing processor and a forwarding engine, respectively.

27. The method as claimed in claim 21, wherein the route entries are comprised of 32 bits or 128 bits.

28. A route lookup method of routing/forwarding tables using a skip list in which route entries are stored in a form of a hash table according to preset prefix lengths in each node generated according to assignment of prefix range of an IP address, comprising the steps of:
   finding an adjacent node starting from a first node of the skip list;
   comparing a destination address with respective hash tables at a corresponding node; and
   considering a matching prefix as a longest prefix, when the hash table includes the destination address.

29. The route lookup method as claimed in claim 28, further comprising the step of finding a next node in the skip list when the hash table does not include the destination IP address.

30. The route lookup method as claimed in claim 28, wherein the skip list comprises a header node and a plurality of nodes each having a key in a range preset in a descending order and storing route entries corresponding to the respective prefix lengths in the hash tables associated with the respective prefix lengths.

31. The route lookup method as claimed in claim 28, wherein the comparison step comprises the steps of:
   comparing the destination address with a hash table having a longest prefix length, out of the hash tables of the corresponding node; and
   comparing a next hash table having a next longest prefix length with the destination address when the destination address is not found in the hash table having the longest prefix length.

32. The route lookup method as claimed in claim 28, wherein the routing/forwarding lookup tables are included in a routing processor and a forwarding engine, respectively.

33. The route lookup method as claimed in claim 28, wherein the route entries are comprised of 32 bits or 128 bits.

34. A high-speed IP router comprising:
   a plurality of line card modules each equipped with a forwarding engine through which packets are input and output;
   a switch fabric for switching the packets between internal ports; and
   a routing processor including a routing table having a skip list architecture comprised of a header node and a plurality of nodes each created according to a prefix range of an IP address, having the prefix length range as a key and storing route entries in a form of hash table according to a set prefix length.

35. A high-speed IP router comprising:
   a plurality of line card modules equipped with a forwarding engine having a forwarding table with a skip list architecture comprised of a header node and a plurality of nodes each created according to a prefix range of an IP address, having the prefix length range as a key and storing route entries in a form of hash table according to a set prefix length;
a switch fabric for switching the packets between internal ports; and
routing processor for controlling an overall routing operation.

36. The high-speed IP router as claimed in claim 35, wherein the routing processor comprises a routing table having a skip list architecture comprised of a header node and a plurality of nodes each created according to a prefix range of an IP address, having the prefix length range as a key and storing route entries in a form of hash table according to a set prefix length.

* * * * *